(12) United States Patent
Zhang et al.

(10) Patent No.: US 11,476,514 B2
(45) Date of Patent: Oct. 18, 2022

(54) INTEGRATED COOLING ASSEMBLY AND BATTERY ASSEMBLY

(71) Applicant: Zhejiang Sanhua Automotive Components Co., Ltd., Zhejiang (CN)

(72) Inventors: Rongrong Zhang, Zhejiang (CN); Jiang Zou, Zhejiang (CN); Zhenshan Zhu, Zhejiang (CN)

(73) Assignee: Zhejiang Sanhua Automotive Components Co., Ltd., Hangzhou (CN)

( * ) Notice: Subject to any disclaimer, the term of this patent is extended or adjusted under 35 U.S.C. 154(b) by 224 days.

(21) Appl. No.: 16/624,827

(22) PCT Filed: Sep. 18, 2018

(86) PCT No.: PCT/CN2018/106128
§ 371 (c)(1),
(2) Date: Dec. 19, 2019

(87) PCT Pub. No.: WO2019/062590
PCT Pub. Date: Apr. 4, 2019

(65) Prior Publication Data
US 2020/0119414 A1    Apr. 16, 2020

(30) Foreign Application Priority Data

Sep. 30, 2017 (CN) .......................... 201710923232.8

(51) Int. Cl.
*H01M 10/613* (2014.01)
*H01M 10/6554* (2014.01)
*H01M 10/653* (2014.01)
*H01M 10/6556* (2014.01)

(52) U.S. Cl.
CPC ..... *H01M 10/6554* (2015.04); *H01M 10/613* (2015.04); *H01M 10/653* (2015.04); *H01M 10/6556* (2015.04)

(58) Field of Classification Search
CPC ............. H01M 10/613; H01M 10/653; H01M 10/6554; H01M 10/6556; H01M 10/625; H01M 10/6569; H01M 2220/20; F25B 41/20; F25B 41/30; Y02E 60/10
See application file for complete search history.

(56) References Cited

U.S. PATENT DOCUMENTS

| 2014/0193686 A1* | 7/2014 | Siering | H01M 10/0481 429/99 |
| 2015/0086831 A1* | 3/2015 | Haussmann | H01M 10/625 429/120 |
| 2016/0164148 A1* | 6/2016 | Yum | H01M 10/613 429/120 |
| 2017/0110773 A1 | 4/2017 | Pucher | |
| 2018/0080693 A1* | 3/2018 | Wang | F28D 9/005 |

FOREIGN PATENT DOCUMENTS

| CN | 101672555 A | 3/2010 |
| CN | 202915775 U | 5/2013 |
| CN | 103650200 A | 3/2014 |
| CN | 103712383 A | 4/2014 |
| CN | 205748088 U | 1/2016 |
| CN | 205373470 U | 7/2016 |
| CN | 205940233 U | 2/2017 |
| CN | 106918165 A | 7/2017 |
| CN | 106981703 A | 7/2017 |
| CN | 107078365 A | 8/2017 |
| EP | 3 327 397 A1 | 5/2018 |
| JP | 2009-170258 A | 7/2009 |
| WO | WO 00/50832 A1 | 8/2000 |
| WO | WO 2017/012495 A1 | 1/2017 |

OTHER PUBLICATIONS

Extended European Search Report for European Application No. 18860173.6, dated Jun. 14, 2021.
CN201710923232.8, Mar. 30, 2020, First Office Action.
International Search Report and Written Opinion for International Application No. PCT/CN2018/106128, dated Dec. 18, 2018.
First Office Action for Chinese Application No. 201710923232.8, dated Mar. 30, 2020.
PCT/CN2018/106128, Dec. 18, 2018, International Search Report and Written Opinion.

* cited by examiner

*Primary Examiner* — Muhammad S Siddiquee
(74) *Attorney, Agent, or Firm* — Wolf, Greenfield & Sacks, P.C.

(57) ABSTRACT

An integrated cooling assembly includes a cooling assembly and a valve assembly. The cooling assembly has a first interface and a second interface. The valve assembly includes a connecting block and a valve core assembly. The connecting block has at least a mounting hole for mounting the valve core assembly, and a first port and a second port in communication with the mounting hole. The second port is located on an inner end surface of the connecting block. The inner end surface faces the cooling assembly. The first interface is in communication with the second port. The valve assembly comprises a first fluid channel. One end of the channel is the first port of the connecting block, and the other end is the second port. A channel passage area of the first fluid channel switches between zero and a specified passage area of the first fluid channel.

20 Claims, 18 Drawing Sheets

US 11,476,514 B2

INTEGRATED COOLING ASSEMBLY AND BATTERY ASSEMBLY

This Application is a national stage filing 35 U.S.C. § 371 of International Patent Application Serial No. PCT/CN2018/106128, filed Sep. 18, 2018, which claims priority to Chinese Patent Application No. 201710923232.8, titled "INTEGRATED COOLING ASSEMBLY AND BATTERY ASSEMBLY", filed on Sep. 30, 2017 with the National Intellectual Property Administration, PRC, the entire contents of these applications are incorporated herein by reference in their entirety.

FIELD

The present application relates to the technical field of heat exchange cooling, and in particular to a cooling integrated assembly and a battery assembly.

BACKGROUND

A battery in a pure electric vehicle or a hybrid electric vehicle or some electric appliances can generate a large amount of heat during operation, and the temperature of the battery is increased. Therefore, the battery needs to be cooled so as to keep the battery in a proper working temperature range.

SUMMARY

An object of the present application is to provide a cooling integrated assembly and a battery assembly.

The cooling integrated assembly provided by the technical solution of the present application includes a cooling assembly and a valve assembly, the cooling assembly has a first connecting port and a second connecting port, the valve assembly and the cooling assembly are fixedly arranged; the valve assembly includes a connecting block and a valve core assembly, the connecting block has a mounting hole, and at least part of the valve core assembly is located in the mounting hole.

The valve assembly includes a first fluid passage, and one end of the first fluid passage is a first end port of the connecting block, the other end of the first fluid passage is a second end port of the connecting block, the second end port of the connecting block is located on an inner end surface of the connecting block, the inner end surface faces the cooling assembly, the first connecting port is in communication with the second end port of the connecting block, and a flow area of the first fluid passage is equal to or greater than zero, and switches between zero and a specified flow area of the first fluid passage; the cooling assembly includes a bottom plate and a circulation plate, and the bottom plate is in fit with the circulation plate, the cooling assembly includes a second fluid passage, the second fluid passage is located between the bottom plate and the circulation plate, the second fluid passage communicates the first connecting port and the second connecting port.

The technical solution of the present application further provides a battery assembly, the battery assembly includes a battery module and a cooling integrated assembly described as above, the integrated cooling assembly includes a cooling assembly, the cooling assembly includes a bottom plate and a circulation plate, the bottom plate and the circulation plate are in fit with each other and fixed, the bottom plate includes a flat plate portion, and the flat plate portion is located at a side of the bottom plate opposite to the circulation plate, at least part of the battery module is in contact with the flat plate portion or is in contact with the flat plate portion through a heat conduction element.

Figure 1:
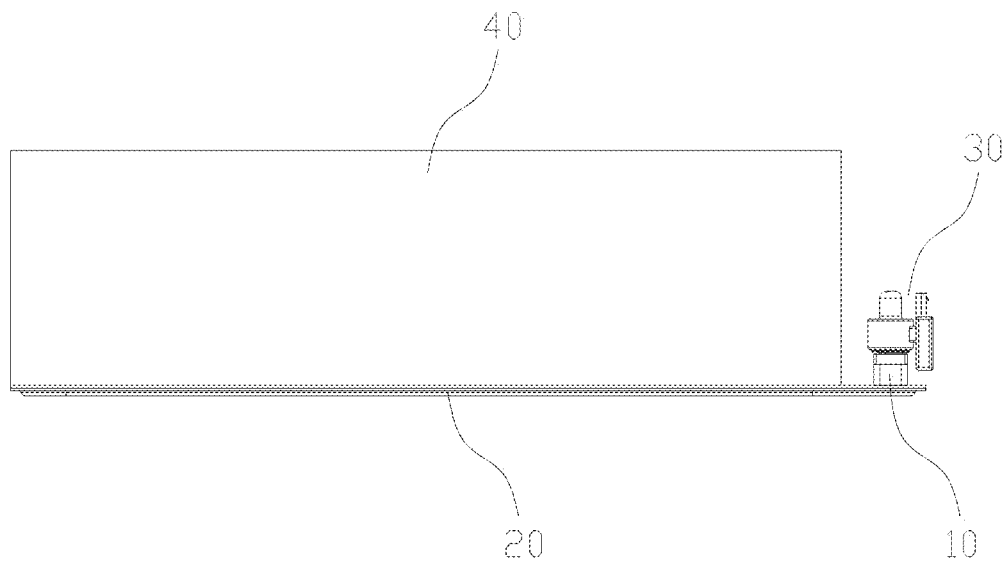
FIG. 1 is a schematic structural view of a first embodiment of a battery assembly according to the present application.

Part of the reference numerals in FIGS. 1 to 47 are as follows:

| 10 | connecting block, | | |
|---|---|---|---|
| 101 | first end port of the connecting block, | | |
| 102 | second end port of the connecting block, | | |
| 103 | third end port of the connecting block, | | |
| 104 | fourth end port of the connecting block, | 105 | mounting hole, |
| 106 | processing pre-opening, | 107 | pressing plate mounting hole |
| 108 | threaded hole, | 108a | screw, |
| 10a | drainage flow passage, | 10b | plug |

-continued

| 10c | first fluid passage, | 10d | third fluid passage, |
|---|---|---|---|
| 20 | cooling assembly, | 201 | bottom plate, |
| 202 | circulation plate, | 202a | second fluid passage, |
| 20a | first connecting port, | 20b | second connecting port, |
| 30 | valve core assembly, | 40 | battery module. |

DETAILED DESCRIPTION OF EMBODIMENTS

In order to make those skilled in the art better understand the technical solution of the present application, the present application will be further described in detail with reference to the drawings and specific embodiments. In all of the following embodiments, cooling assemblies of a cooling integrated assembly are substantially the same, and the cooling assembly includes a bottom plate and a circulation plate, a valve core assembly and a connecting block are combined to form a valve assembly, and the valve assembly has a throttling function, different embodiments are based on various variations of the structure of the connecting block, a battery module is shown in the drawings of the first embodiment, and the cooling assembly in other embodiments is also used for cooling a battery module, the drawings are not shown.

Figure 2:
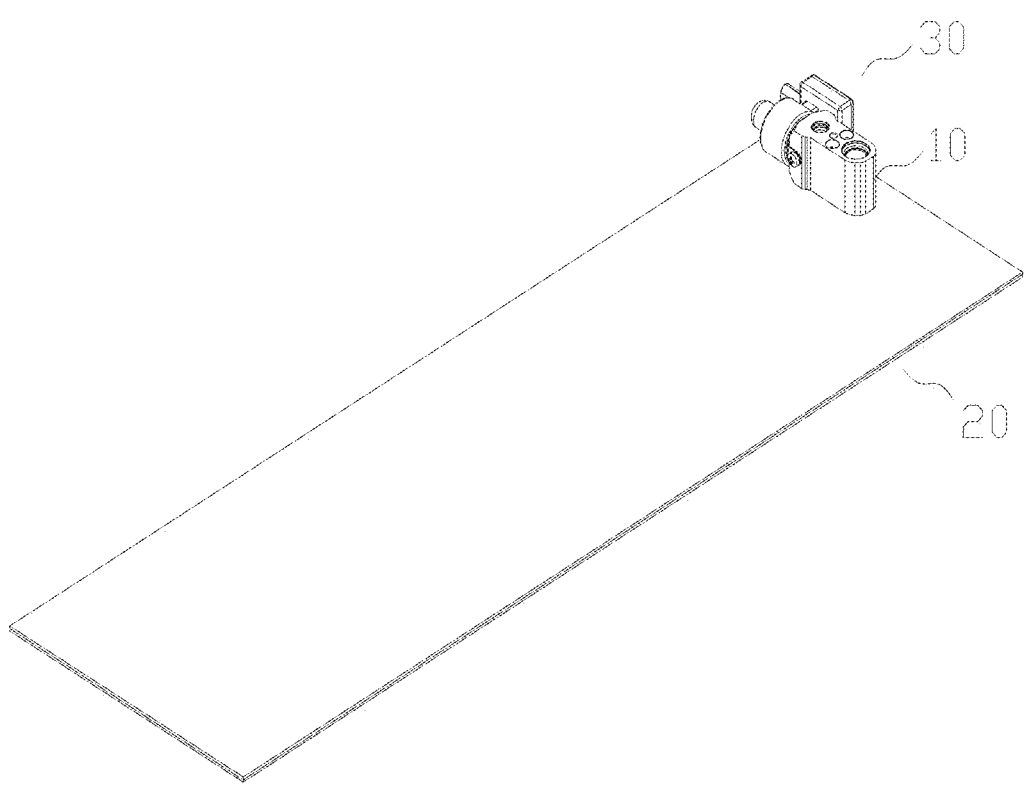
FIG. 2 is a schematic structural view of a cooling integrated assembly in the battery assembly shown in FIG. 1.
Figure 3:
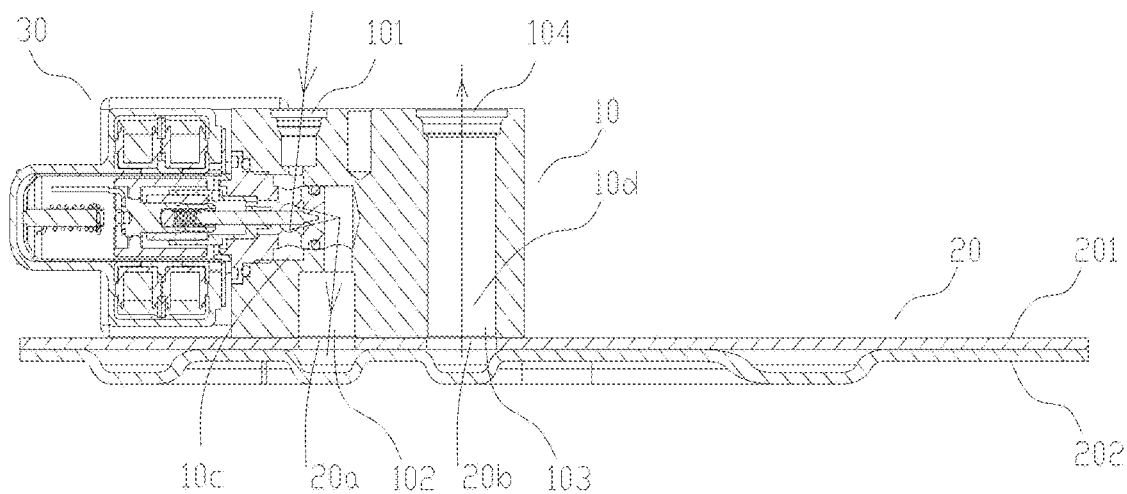
FIG. 3 is a sectional view of the cooling integrated assembly shown in FIG. 2.
Figure 4:
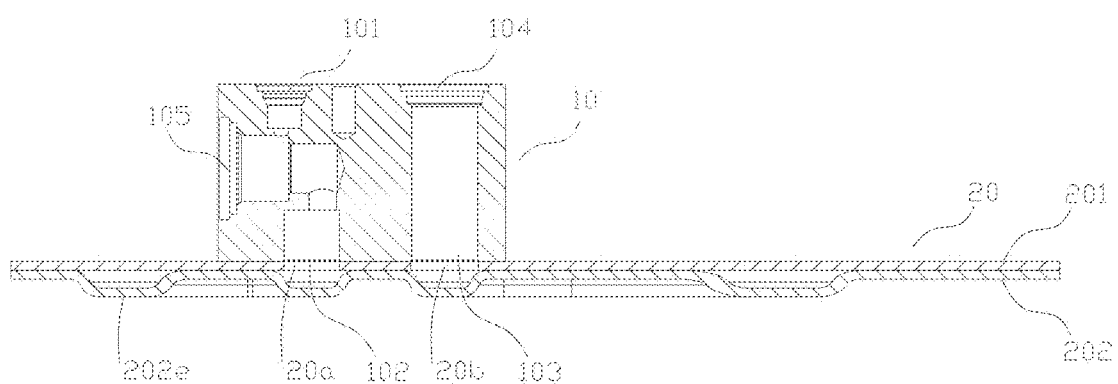
FIG. 4 is a schematic structural view of the cooling integrated assembly shown in FIG. 3 after a valve core assembly is removed.
Figure 5:
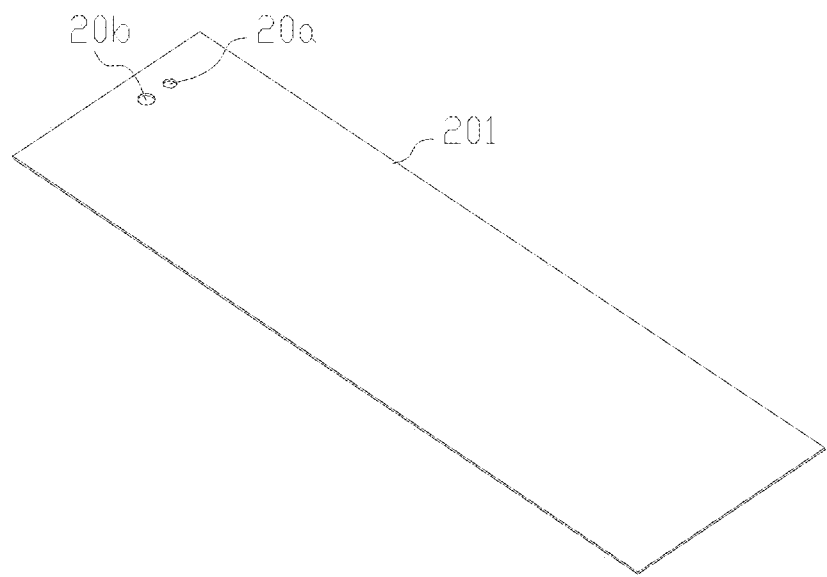
FIG. 5 is a schematic structural view of a bottom plate of a cooling assembly in the cooling integrated assembly shown in FIG. 2.
Figure 6:
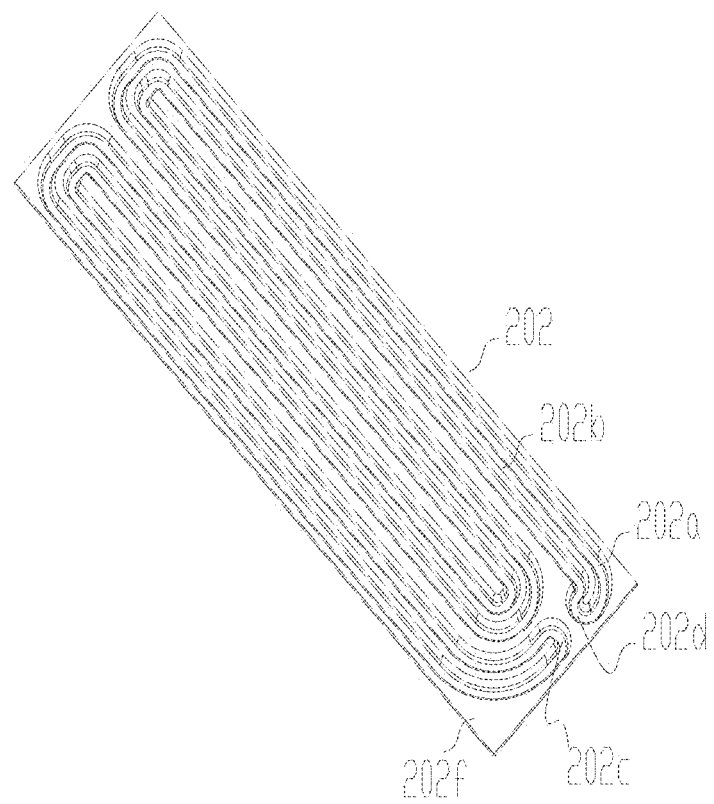
FIG. 6 is a schematic structural view of a circulation plate of the cooling assembly in the cooling integrated assembly shown in FIG. 2.

In an embodiment, please referring to FIGS. 1-6, FIG. 1 is a schematic structural view of a first embodiment of a battery assembly according to the present application. FIG. 2 is a schematic structural view of a cooling integrated assembly in the battery assembly shown in FIG. 1. FIG. 3 is a sectional view of the cooling integrated assembly shown in FIG. 2. FIG. 4 is a schematic structural view of the cooling integrated assembly shown in FIG. 3 after a valve core assembly 30 is removed. FIG. 5 is a schematic structural view of a bottom plate 201 of a cooling assembly in the cooling integrated assembly shown in FIG. 2. FIG. 6 is a schematic structural view of a circulation plate 202 of the cooling assembly in the cooling integrated assembly shown in FIG. 2.

In the present embodiment, the battery assembly includes a battery module 40 and a cooling integrated assembly. The battery module 40 is arranged in the cooling integrated assembly. The cooling integrated assembly includes a cooling assembly 20, a valve core assembly 30 and a connecting block 10. The valve assembly formed by combining the valve core assembly 30 with the connecting block 10 has a throttling function. The cooling assembly 20 is shown in FIGS. 3-5, the cooling assembly 20 has a structure of at least two layers. The cooling assembly 20 includes a bottom plate 201 and a circulation plate 202. The connecting block 10 is fixed to the bottom plate 201, and the connecting block 10 and the bottom plate 201 are coordinately fixed.

The cooling integrated assembly includes a valve assembly. The valve assembly is fixed to the cooling assembly 20. The valve assembly includes the connecting block 10 and the valve core assembly 30.

The connecting block 10 may be directly fixed to the bottom plate 201, and the connecting block 10 may also be fixed to the bottom plate 201 through an external structure.

The bottom plate 201 is a flat plate or partially bent (shown as a flat plate structure) or an arc-shaped plate and the like. One surface of the bottom plate 201 may be fixed to the circulation plate 202 by welding. The welded surface may be provided with a composite layer. The other surface of the bottom plate 201 is provided with a flat plate end portion which may be in contact with at least part of the battery module 40 or in contact with the at least part of the battery module 40 through a heat conduction element. The other surface of the bottom plate 201 may also be a mounting surface of the connecting block 10, as shown in FIG. 4. The bottom plate 201 includes a first connecting port 20*a* and a second connecting port 20*b*. The heat conduction element includes, but is not limited to, a metal sheet, a metal thin sheet or other heat conduction materials.

The first end port 20*a* is in communication with the connecting block 10, and the second end port 20*b* is in communication with the connecting block 10. The welding of the bottom plate 201 and the circulation plate 202 has many ways, for example, a composite layer may be arranged on one plate of contact surfaces of the bottom plate 201 and the circulation plate 202, and the melting point of the composite layer material is lower than that of the circulation plate 202 and the bottom plate 201, the arrangement of the composite layer enables the bottom plate 201 and the circulation plate 202 may be melted through a furnace, so that the bottom plate 201 and the circulation plate 202 are welded together. Apparently, the bottom plate 201 and the circulation plate 202 may also have other welding ways.

Referring to FIG. 4 and FIG. 6, the circulation plate 202 is provided with a protrusion 202*e* and a groove 202*b*. The protrusion 202*e* protrudes toward a direction away from the bottom plate 201. The groove 202*b* is opposite to the protrusion. The groove 202*b* is located on one side, facing the bottom plate 201, of the circulation plate 202. The cooling assembly 20 includes a second fluid passage 202*a*. The second fluid passage 202*a* is located between a wall portion of the circulation plate 202 forming the groove 202*b* and the bottom plate 201. The circulation plate 202 includes a main body portion 202*f*, the groove 202*b* extends continuously, the main body portion 202*f* is sealed to the bottom plate 201, and the groove 202*b* includes a first tail end portion 202*c* and a second tail end portion 202*d*, a position of the first tail end portion 202*c* is opposite to the first connecting port 20*a*, a position of the second tail end portion 202*d* is opposite to the second connecting port 20*b*. In this case, the first tail end portion 202*c* and the second tail end portion 202*d* of the groove refer to a starting end and an ending end of the groove. The second fluid passage 202*a* is used for the flow of refrigerant or other refrigeration media (such as $CO_2$), and in order to simplify the description, the following embodiments are all described by example of refrigerant. The second fluid passage 202*a* should cover the entire surface of the circulation plate 202 as much as possible, and reduce the flow resistance as much as possible, and the distribution of the second fluid passage 202*a* may be optimized and designed under this demand. Thus, the fluid enters the second fluid passage 202*a* from the first connecting port 20*a*, and the fluid absorbs external heat between the bottom plate 201 and the circulation plate 202. Since the relative thickness of the circulation plate 202 and the bottom plate 201 is small, the flat plate portion is in contact with at least part of the battery module 40 or is in contact with at least part of the battery module 40 through the heat conduction element, so that the heat of the battery module may be rapidly transferred to the fluid through the bottom plate 201, and the cooling efficiency of the battery is high.

The thickness of the bottom plate 201 or the circulation plate 202 is generally 0.8-2.5 mm, thus, the battery module which is in contact with the flat plate portion can more quickly transfer heat to the fluid in the cooling assembly through the flat plate portion, achieving efficient heat exchange.

Figure 7:
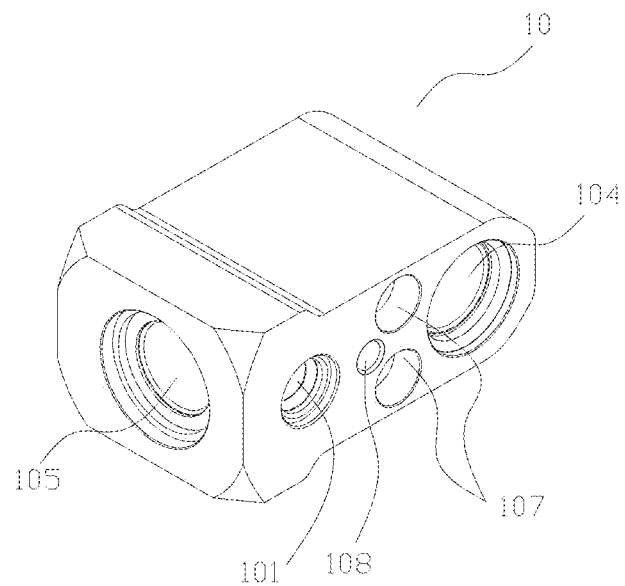
FIG. 7 is a schematic structural view of a connecting block in the cooling integrated assembly shown in FIG. 3.
Figure 8:
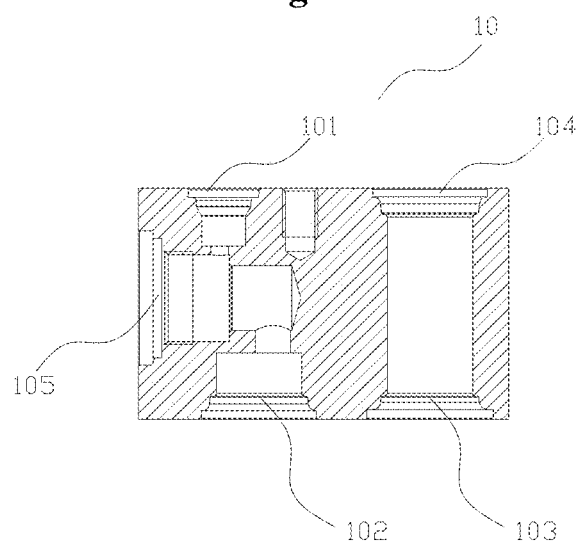
FIG. 8 is a sectional view of the connecting block shown in FIG. 7.
Figure 9:
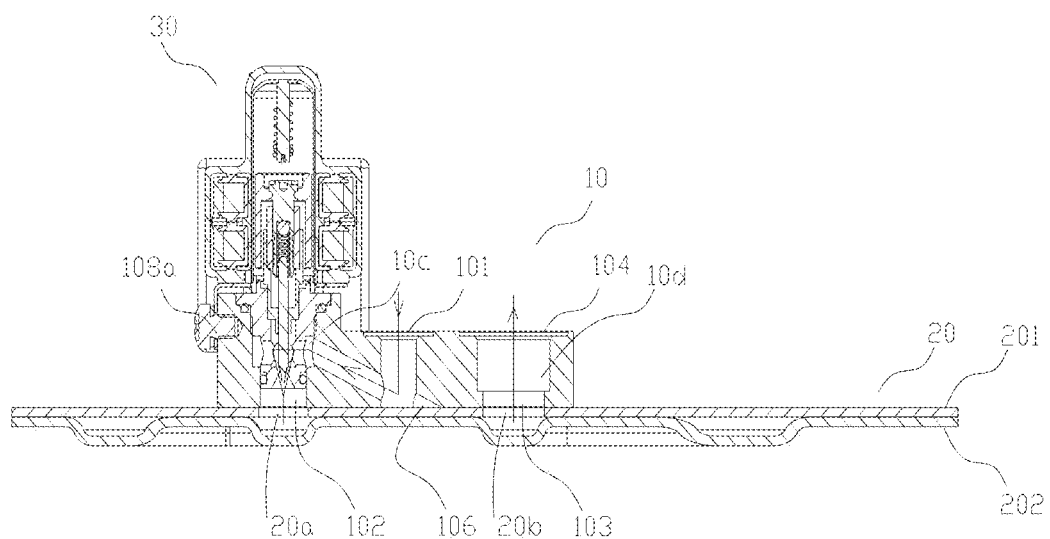
FIG. 9 is a structural sectional view of a second embodiment of the cooling integrated assembly according to the present application.

Referring to FIGS. 7-10, FIG. 7 is a schematic structural view of a connecting block 10 in the cooling integrated assembly shown in FIG. 3. FIG. 8 is a sectional view of the connecting block 10 shown in FIG. 7.

In conjunction with FIG. 3 and FIG. 6, the cooling assembly 20 has the first connecting port 20*a* and the second connecting port 20*b*, the refrigerant enters into the second fluid passage 202*a* from the first connecting port 20*a*, and then flows out of the second end port 20*b*. The connecting block 10 fixed to the cooling assembly 20 has a first end port 101 of the connecting block, the second end port 102 of the connecting block, the third end port 103 of the connecting block, the fourth end port 104 of the connecting block and a mounting hole 105 used for mounting a valve core component in the valve core assembly 30.

As shown in FIG. 2, the connecting block 10 may be mounted on a surface of the bottom plate 201 of the cooling assembly 20 and almost fits to the surface of the bottom plate 201. Herein, a surface of the connecting block 10 fitting to the surface of the bottom plate 201 is defined as an inner end surface, that is, a surface of the connecting block 10 facing the bottom plate 201 of the cooling assembly 20 is the inner end surface. The third end port 103 and the second end port 102 of the connecting block are located on the inner end surface of the connecting block 10, and the connecting block 10 may be directly fixed to the cooling assembly 20 by welding to form a whole, and after being fixed by welding, it is required that the first connecting port 20*a* of the cooling assembly 20 is in communication with the second end port 102 of the connecting block, the second connecting port 20*b* is in communication with the third end port 103, and the first end port 101 and the fourth end port of the connecting block are located on a same end surface of the connecting block 10. In the present embodiment, the first end port 101 and the fourth end port 104 of the connecting block are located on an outer end surface of the connecting block 10 that is opposite to the inner end surface.

In the present application, the end surface refers to an outer contour of the connecting block, and is not limited to a plane; for example, it is described herein that the first end port 101 and the fourth end port 104 of the connecting block are located on a same end surface of the connecting block 10, which refers to that the first end port 101 and fourth end port 104 of the connecting block are located on the same side end portion of the outer contour of the connecting block 10, and the end ports may be arranged not on a same plane.

Apparently, when each surface of the connecting block is of a planar structure, at this moment, locating on the same end face is a meaning of an end surface on narrow sense.

In addition, a hole opening of the mounting hole 105 is provided at a side end surface of the connecting block 10, the connecting block 10 shown in FIG. 7 is substantially a cuboid structure (a corner end position has a rounded corner, and a side provided with the mounting hole 105 has a thicker thickness), the hole opening of the mounting hole 105 is provided in one of the four side end surfaces, and the mounting hole 105 is in communication with the first end port 101 and the second end port 102 of the connecting block.

The second end port 102 and the third end port 103 of the connecting block are distributed along a length direction of the connecting block 10 having a cuboid structure, corresponding to the positions of the first connecting port 20*a* and the second connecting port 20*b*; correspondingly, the first end port 101 and the fourth end port 104 of the connecting block may also be distributed along the length direction of the connecting block 10, as shown in FIG. 7, the hole opening of the mounting hole 105 is close to a side end surface of the first end port 101 of the connecting block, and at the moment, passages for facilitating the flow of the refrigerant are formed between the first end port 101 and the second end port 102 of the connecting block and between the third end port 103 and the fourth end port 104, which are defined as a first fluid passage 10c and a third fluid passage 10d, respectively. A flow area of the first fluid passage 10c is equal to or greater than zero, and switches between zero and a specified flow area of the first fluid passage 10c. The specified flow area of the first fluid passage 10c refers to a flow area of the first fluid passage 10c when the valve core assembly 30 is at the maximum opening degree. And the flow area of the first fluid passage 10c refers to a flow area of a section of the first fluid passage 10c having the minimum fluid flow area, such as a throttle section, and the flow area is a sectional area of an inner diameter of the fluid passage.

In the present embodiment, the first end port 101 and the third end port 103 of the connecting block are slightly staggered in an axial direction of the mounting hole 105, so as to be respectively aligned with positions of an inlet and an outlet of the mounted valve core component. In other embodiments, the first end port 101, the fourth end port 104, the second end port 102 and the third end port 103 of the connecting block are also distributed along the length direction of the connecting block 10.

Thus, when the valve core component of the valve core assembly 30 is mounted in the mounting hole 105, the refrigerant entering from the first end port 101 of the connecting block may flow to the second end port 102 of the connecting block after being throttled by the valve core component, and then enters the second fluid passage 202a through the first connecting port 20a to participate in heat exchange, and then flows out from the second connecting port 20b and flows out of the cooling integrated assembly through the third end port 103 and the fourth end port 104 of the connecting block. Arrows in FIG. 3 and in the corresponding drawings of the other embodiments described below represent flow paths of the refrigerant. In the present embodiment, the valve core assembly 30 includes a valve needle and a throttling hole. The throttling hole is a portion of the first fluid passage 10c, the valve core assembly forms the throttling hole, a gap is reserved between the valve needle and a wall portion of the throttling hole, a flow area of the throttling hole is more than zero; or the valve needle inserts into the throttling hole, the flow area of the throttling hole is equal to zero.

In other embodiments, the cooling integrated assembly may also include a valve ball and a throttling hole. The throttling hole is a portion of the first fluid passage 10c, and the valve ball closes the throttling hole, the flow area of the throttling hole is equal to zero; a gap is formed between the valve ball and the throttling hole, and the flow area of the throttling hole is more than zero.

As shown in FIG. 7, the connecting block 10 is further provided with a threaded hole 108, so that a screw or a bolt 108a is screwed into the threaded hole 108 to press the valve core assembly 30 tightly.

Figure 46:
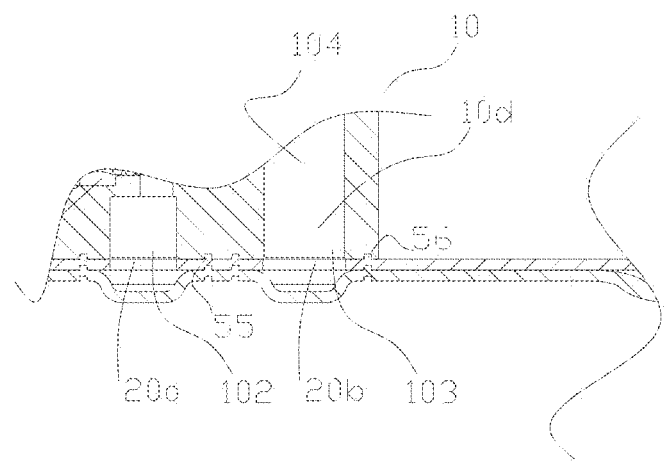
FIG. 46 is a schematic view of another embodiment of the cooling integrated assembly.

There are various ways for fixing the connecting block 10 to the cooling assembly 20, for example, the connecting block 10 and the cooling assembly 20 may be fixed by welding. The welding between the bottom plate 201 and the connecting block 10 may be achieved by arranging a composite layer or other solder. Referring to FIG. 46, the bottom plate 201 includes protrusions 55, 56, and the protrusions 55, 56 protrude in a direction toward the connecting block, the inner end surface of the connecting block 10 is provided with grooves, the grooves are fitted with the protrusions 55, 56. Specifically, the grooves are arranged around the second end port 102 of the connecting block, so that the protrusion 55 and the groove form a welding line around the second end port 102 of the connecting block, which not only ensures the welding strength of the connecting block and the cooling assembly, but also enables the second end port 102 of the connecting block to be sealed due to the arrangement of the protrusion and the groove to not easily generate a leakage risk. Similarly, a round groove is arranged around the third end port 103 of the connecting block, the groove is fitted with the protrusion 56, which ensures the welding strength of the third end port 103 of the connecting block and the cooling assembly. The arrangement of the protrusions on the bottom plate 201 may be realized, for example, by rolling the fixed cooling assembly 20.

Figure 47:
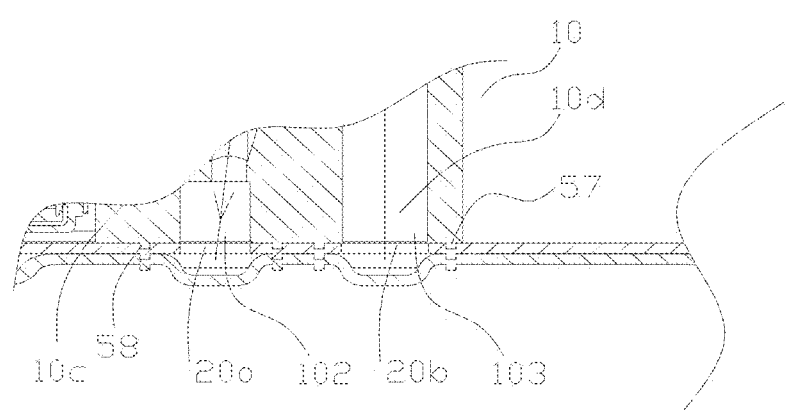
FIG. 47 is a schematic view of another embodiment of the cooling integrated assembly.

In other embodiment, referring to FIG. 47, the connecting block 10 is provided with protrusions 57, 58, and the protrusion 57 is located around the third end port 103 of the connecting block, the protrusion 58 is located around the second end port 102 of the connecting block, the cooling assembly 20 is provided with a groove, the protrusions 57, 58 are fitted with the grooves of the cooling assembly 20 and fixed by welding, so that the welding of the protrusions 57, 58 and the cooling assembly 20 is relatively easy, the welding strength is high, and the leakage risk around the second end port 102 and the third end port 103 of the connecting block can also be reduced. The protrusions 57, 58 may be a single block or in a form of convex ribs.

Figure 44:
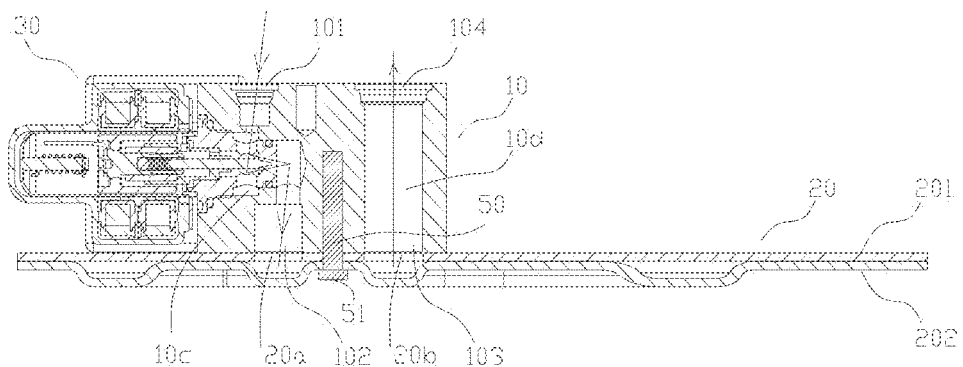
FIG. 44 is a schematic view of another embodiment of the cooling integrated assembly.

Referring to FIG. 44, the cooling integrated assembly includes a fixing member 50. The connecting block 10 and the cooling assembly 20 may be fixed by the fixing member 50, such as a bolt. The connecting block 10 is provided with a first fixing hole, the cooling assembly 20 is provided with a second fixing hole, and the second fixing hole corresponds to the first fixing hole of the connecting block 10. A diameter of a tail end 51 of the fixing member 50 is greater than that of the first fixing hole and the second fixing hole, a large portion of the fixing member 50 inserts into the fixing hole, and the fixing member is in threaded fit with the first fixing hole and the second fixing hole, and the tail end 51 of the fixing member does not insert into the first fixing hole and the second fixing hole, since the diameter of the tail end 51 is large, the tail end 51 of the fixing member can abut against a bottom of the cooling assembly 20, the bottom of the cooling assembly 20 is a side portion where no connecting block 10 is provided. The connecting block 10 and the cooling assembly 20 may be directly fixed by bolts, or firstly, the connecting block 10 and the cooling assembly 20 are fixed by welding, and then fixed by bolts, that is, the fixing member at this time is bolts.

Figure 45:
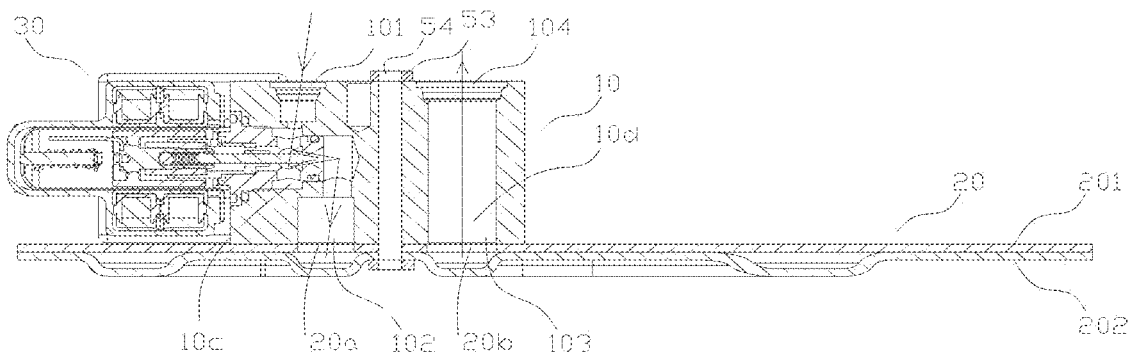
FIG. 45 is a schematic view of another embodiment of the cooling integrated assembly.

Referring to FIG. 45, the cooling integrated assembly further includes a fixing plate 53 and a fixing member, the fixing plate 53 includes at least two side portions, and one of the side portions abuts against the connecting block 10, the other side portion abuts against the cooling assembly 20. The fixing plate 53 may be in a form of a bend, which is equivalent to that the cooling assembly 20 and the connecting block 10 are clamped between the two side portions of the fixing plate 53. The two side portions of the fixing plate 53 are respectively provided with through holes 54, the connecting block 10 and the cooling assembly 20 are also provided with through holes, the through holes in the fixing plate 53 correspond to the through holes arranged in the connecting block 10 and the cooling assembly 20, and the fixing member inserts into the through holes, the fixing member is in threaded fit with the through holes so as to realize the fixation of the fixing plate 53, the connecting block 10 and the cooling assembly 20. The fixing member is, for example, a bolt, a screw and the like.

In other embodiments, the fixing plate may also be two, one side portion of the fixing plate abuts against the connecting block 10, and the other side portion of the fixing plate abuts against the cooling assembly 20. Similarly, the two fixing plates, the cooling assembly 20 and the connecting block 10 are provided with through holes corresponding to the positions, thereby achieving tight fixation by the fixing member.

The following technical effects may be achieved through the above arrangement.

The assembly in the present solution includes the valve core assembly 30, the connecting block 10 and the cooling assembly 20, which are fixedly arranged to form a whole, the first connecting port of the cooling assembly 20 is in communication with the second end port 102 of the connecting block, so that the structure of the cooling integrated assembly is simple and compact, in addition, the connecting block 10 includes the first fluid passage 10c, the flow area of the first fluid passage 10c switches between zero and a specified flow area of the first fluid passage, so that the flow rate of the flow flowing through the cooling assembly 20 may be controlled, which facilitates improving heat exchange efficiency. Compared with a conventional thermal expansion valve, the cooling integrated assembly may be adjusted more precisely, when the cooling integrated assembly is applied to the cooling of an automobile battery, the working temperature and the environment temperature in a working process of the battery may be ensured to be in an optimal interval.

Moreover, a distance between the connecting block 10 and the cooling assembly 20 is very close, and the refrigerant enters into the cooling assembly 20 for heat exchange after being throttled in the connecting block 10, thereby the gas-liquid stratification phenomenon of the refrigerant caused by the connecting pipes is reduced, so that the gas-liquid mixture is evenly distributed, which approximates a theoretical design most and has less influence on heat exchange performance, thereby heat exchange efficiency is improved.

In addition, the mounting of the cooling integrated assembly is simpler and time-saving; when the cooling integrated assembly is mounted to a finished automobile or other equipment, only the cooling integrated assembly needs to be mounted, a mounting bracket does not need to be arranged, and an external connection pipe does not need to be mounted to connect to an expansion valve and the cooling assembly 20.

It should be emphasized that, in a further optimization solution, a final outlet (the fourth end port 104 of the connecting block) of the cooling integrated assembly can be located on the same end surface with the first end port 101 of the connecting block, the structure is very compact and facilities the connection of the external connection pipe. Moreover, when the refrigerant inlet and outlet of the entire assembly is connected to the external connection pipe, the same pressure block (FIG. 7 shows two mounting holes 107 of the pressure block) may be mounted at the connection, that is, the same pressure block is tightly pressed at the connection, thereby further saving parts, reducing cost and product weight, and the structure is more compact.

It should be understood that the connecting block 10 is of a "one end for flowing in and one end for flowing out" structure, that is, a passage between the first end port 101 and the second end port 102 of the connecting block is a working passage. Herein, the second fluid passage between the third end port 103 and the fourth end port 104 of the connecting block is further provided in the connecting block 10, an object of which is to allow the refrigerant flowing out of the cooling assembly 20 to flow out of the connecting block 10, and then the final outlet can be located on the same end surface with the first end port 101 of the connecting block, so that when the refrigerant inlet and outlet of the entire assembly is connected to the external connection pipe, the same pressure block is mounted at the connection, that is, the same pressure block is tightly pressed at the connection, thereby further saving parts, and the structure is more compact.

Furthermore, the mounting performance of the cooling integrated assembly is more reliable. Since the connecting pipe between the valve core assembly and the cooling assembly is no longer required, the shock resistance is significantly improved, and the leakage risk between the valve core assembly and the cooling assembly 20 is significantly reduced.

It should be noted that, in the present embodiment, the first end port 101 and the fourth end port 104 of the connecting block are located on the outer end surface of the connecting block 10, the second end port 102 and the third end port 103 of the connecting block are located on the inner end surface of the connecting block 10, and the mounting hole 105 is located on the side end surface, as shown in FIG. 8, at this time, a refrigerant flow path formed by the first end port 101 of the connecting block, the valve core component (a position of the mounting hole 105) and the second end port 102 of the connecting block is almost in a straight line shape and runs through the connecting block 10, and a path formed between the fourth end port 104 and the third end port 103 of the connecting block that the refrigerant is flowed out is also a straight line shape. The arrangement of the flow path in a straight line shape enables the flow resistance to be relatively small and the pressure drop to be lowered, which improves the heat exchange efficiency.

Figure 10:
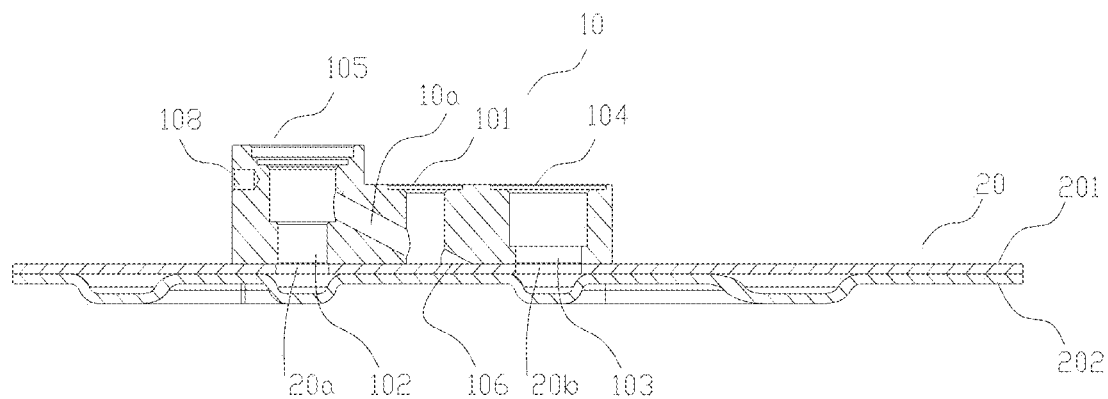
FIG. 10 is a schematic structural view of the cooling integrated assembly shown in FIG. 9 after a valve core assembly is removed.
Figure 11:
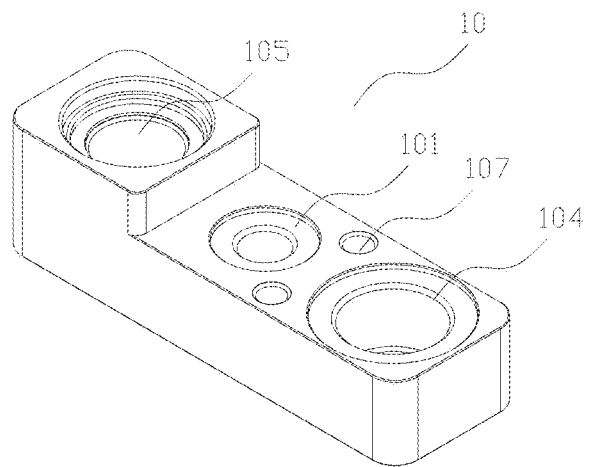
FIG. 11 is a schematic structural view of a connecting block in the cooling integrated assembly shown in FIG. 10.
Figure 12:
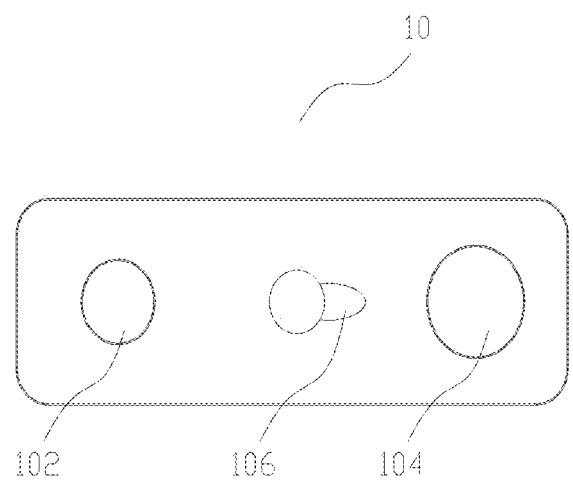
FIG. 12 is a bottom view of FIG. 11.
Figure 13:
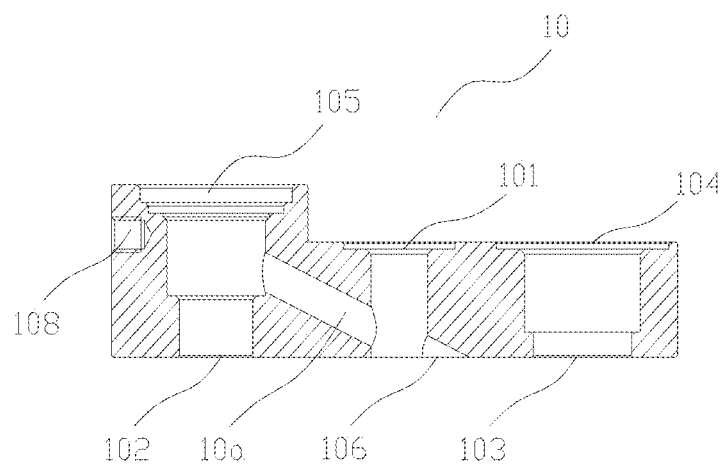
FIG. 13 is a sectional view of the connecting block shown in FIG. 11.

In other embodiments, referring to FIGS. 9-13, FIG. 9 is a structural sectional view of a second embodiment of the cooling integrated assembly according to the present application. FIG. 10 is a schematic structural view of the cooling integrated assembly shown in FIG. 9 after the valve core assembly 30 is removed. FIG. 11 is a schematic structural view of the connecting block 10 in the cooling integrated assembly shown in FIG. 10. FIG. 12 is a bottom view of FIG. 11. FIG. 13 is a sectional view of the connecting block 10 shown in FIG. 11.

The structure of the connecting block 10 in the present embodiment is different from that in the first embodiment, and other structures are substantially the same, the connecting mode and the communicating mode of the connecting block 10 and the cooling assembly 20 are also substantially the same, and repeated description is not repeated herein.

In the second embodiment, the hole opening of the mounting hole 105 for mounting the valve core component, the first end port 101 and the fourth end port 104 of the connecting block are located on the outer end surface of the connecting block 10 that opposite to the inner end surface, at this time, the hole opening of the threaded hole 108 is arranged on the side end surface of the connecting block 10. The second end port 102 and the third end port 103 of the connecting block are also arranged on the inner end surface, and the inner end surface is attached to the bottom plate 201 of the cooling assembly 20, so as to be in communication with the first connecting port 20a and the second connecting port 20b.

Since the hole opening of the mounting hole 105 is also arranged on the outer end surface, and the refrigerant entering an interior of the connecting block 10 from the first end port 101 of the connecting block needs to flow through the mounting hole 105, a drainage flow passage 10a may be arranged in the interior of the connecting block 10 to be in communication with the first end port 101 of the connecting block and the mounting hole 105 in this case, as shown in FIG. 13. At this time, the mounting hole 105 and the second end port 102 of the connecting block may be formed by directly running through the inner end surface and the outer end surface of the connecting block 10. When the connecting block is arranged in this way, the flow path is different from the flow path in a straight line shape in the first embodiment, the flow path formed by the first end port 101 of the connecting block, the valve core component (the position of the mounting hole 105) and the second end port 102 of the connecting block has a bending section, so that the height of the entire path is shortened, and the thickness required for the entire connecting block 10 is reduced, thereby simplifying the structure of the connecting block 10, as shown in FIGS. 11, 13, the connecting block 10 is a thin block structure and is also substantially cuboid.

A distance between the first end port 101 of the connecting block and the inner end surface may be very small (a distance between the fourth end port 104 of the connecting block and the inner end surface can also be very small) due to the arrangement of the drainage flow passage 10a, and the mounting hole 105 needs a certain thickness to meet the mounting of the valve core component in the valve core assembly 30, so the end surface at the first end port 101 and the fourth end port 104 of the connecting block is lower than the position of the mounting hole 105, thereby forming a step at the outer end surface.

In addition, in order to form the drainage flow passage 10a that is in communication with the first end port 101 of the connecting block and the mounting hole 105 in the connecting block 10, the connecting block 10 may have a processing pre-opening 106. As shown in FIG. 13, the processing pre-opening 106, the second end port 102 and the third end port 103 of the connecting block are located on the inner end surface, the inclined drainage flow passage 10a is machined and formed from the processing pre-opening 106, that is, an inclined passage, a height direction of the connecting block 10 is taken as an up or down direction, the drainage flow passage 10a has an upper end port and a lower end port. The upper end port is in communication with the mounting hole 105, and the lower end port is in communication with the first end port 101 of the connecting block. Apparently, the drainage flow passage 10a at the moment serves as a portion of the first fluid passage 10c.

The processing pre-opening 106 is located on the inner end surface to facilitate processing the drainage flow passage 10a, and the connecting block 10 is fitted and attached to the surface of the bottom plate 201 after being welded to the cooling assembly 20, which can also satisfy the sealing requirement.

In FIGS. 12 and 13, when the first end port 101 of the connecting block is machined, a through hole directly runs through the inner end surface and the outer end surface of the connecting block 10 along the thickness direction of the connecting block 10. One end of the through hole is the first end port 101 of the connecting block, and the processing pre-opening 106 may be opened at the other end port. When the inclined drainage flow passage 10a is machined, the drainage flow passage 10a may be in communication with the mounting hole 105 after passing through the through hole from the processing pre-opening 106, the drainage flow passage 10a at the moment is in communication with the first end port 101 of the connecting block through the through hole, which is convenient to process and easy to implement.

Figure 14:
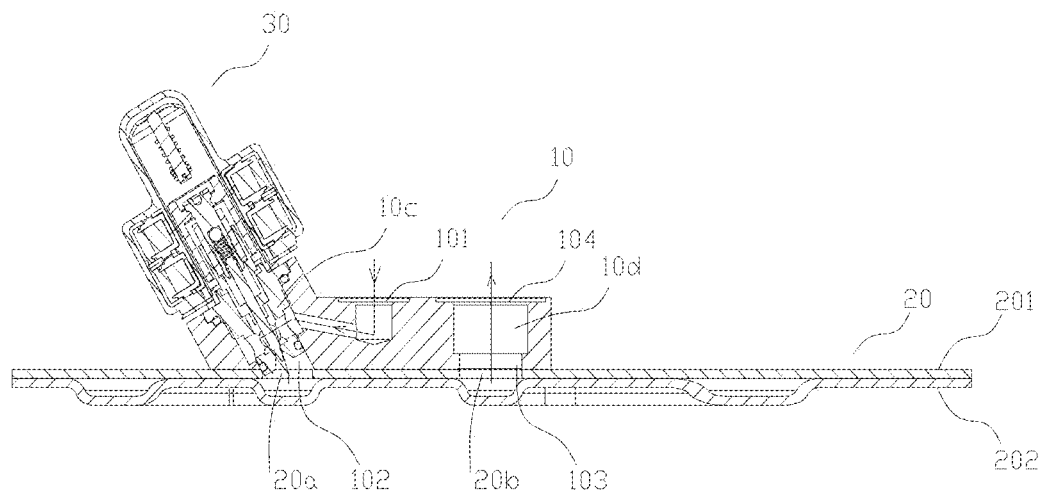
FIG. 14 is a structural sectional view of a third embodiment of the cooling integrated assembly according to the present application.
Figure 15:
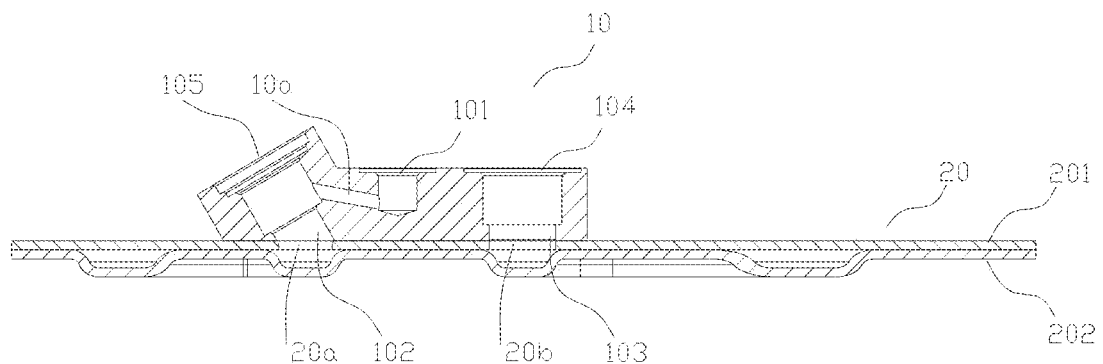
FIG. 15 is a schematic structural view of the cooling integrated assembly shown in FIG. 14 after a valve core assembly is removed.
Figure 16:
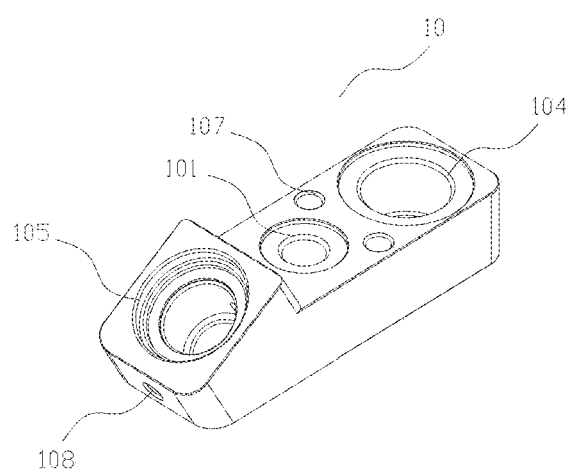
FIG. 16 is a schematic structural view of a connecting block in the cooling integrated assembly shown in FIG. 15.
Figure 17:
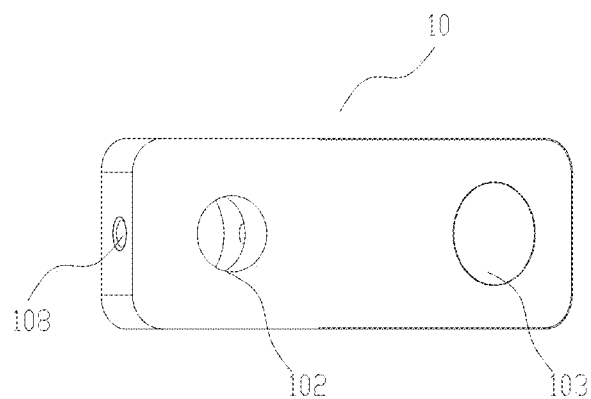
FIG. 17 is a bottom view of FIG. 16.
Figure 18:
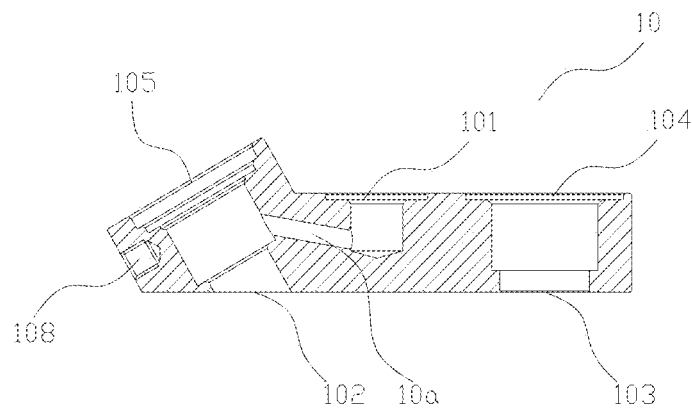
FIG. 18 is a sectional view of the connecting block shown in FIG. 16.

In other embodiments, referring to FIGS. 14-18, FIG. 14 is a structural sectional view of a third embodiment of the cooling integrated assembly according to the present application. FIG. 15 is a schematic structural view of the cooling integrated assembly shown in FIG. 14 after the valve core assembly 30 is removed. FIG. 16 is a schematic structural view of the connecting block 10 in the cooling integrated assembly shown in FIG. 15. FIG. 17 is a bottom view of FIG. 16. FIG. 18 is a sectional view of the connecting block 10 shown in FIG. 16.

The structure of the connecting block in the third embodiment is substantially the same as the structure in the second embodiment. The hole opening of the mounting hole 105 in the third embodiment is also arranged on the outer end surface with the first end port 101 and the fourth end port 104 of the connecting block, the threaded hole 108 is arranged on the side end surface of the connecting block 10, and the drainage flow passage 10a used for being in communication with the first end port 101 of the connecting block and the mounting hole 105 is processed in the connecting block 10.

Only, the outer end surface of the connecting block 10 in the third embodiment is partially provided with an inclined surface, and the hole opening of the mounting hole 105 is provided at the inclined surface. The connecting block 10 is also in a thin block shape, and the outer end surface of the connecting block 10 forms a step at the position of the mounting hole 105, as shown in FIGS. 14 and 15, a top surface of the step is an inclined surface, the through hole vertically runs through the inclined surface to the inner end surface. One end of the through hole is the hole opening of the mounting hole 105, and the other end port is the second end port 102 of the connecting block. An equivalent diameter of the hole opening of the mounting hole 105 is greater than that of a passage section of the drainage flow passage 10a, so that the mounting hole 105 can serve as a processing pre-opening of the drainage flow passage 10a.

At this time, the through hole running through the inclined surface is inclined, that is, the mounting hole 105 is also inclined, and it is inclined from outside to inside toward the first end port 101 of the connecting block, so that the processing pre-opening of the drainage flow passage 10a is not needed to be separately provided, and the mounting hole 105 arranged on the inclined surface may be used as the processing pre-opening. The drainage flow passage 10a is machined inside the connecting block 10 from the mounting hole 105, and an inclined angle of the drainage flow passage 10a formed by the above method relative to the inner end surface may be reduced or may be parallel to the inner end surface. As shown in FIG. 15, compared with the second embodiment, when the refrigerant enters into the mounting hole 105 flowing through the first end port 101 of connecting block and the drainage flow passage 10a, the flow path is more gentle, and the flow resistance and the pressure drop are smaller.

Figure 19:
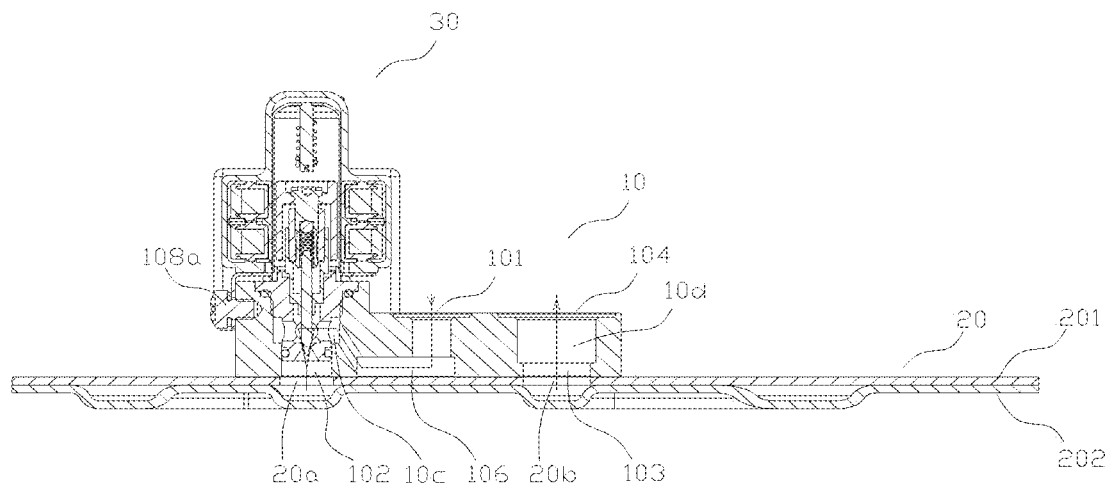
FIG. 19 is a structural sectional view of a fourth embodiment of the cooling integrated assembly according to the present application.
Figure 20:
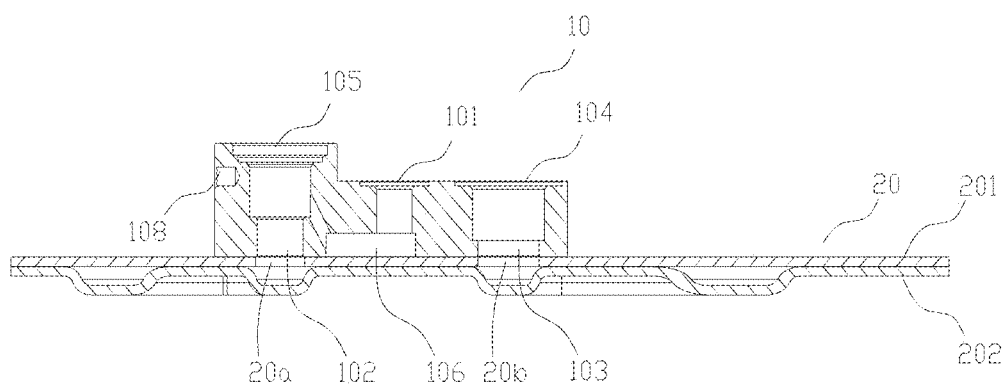
FIG. 20 is a schematic structural view of the cooling integrated assembly shown in FIG. 19 after a valve core assembly and a coil assembly are removed.
Figure 21:
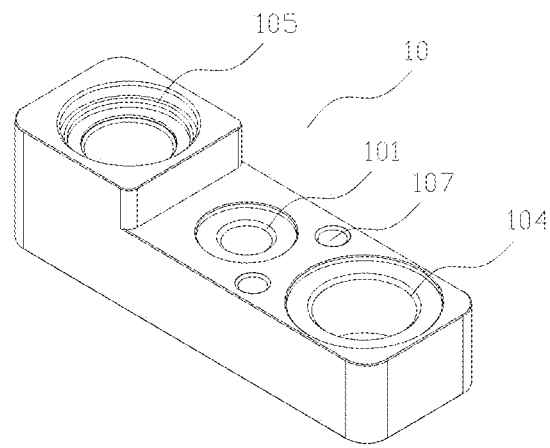
FIG. 21 is a schematic structural view of a connecting block in the cooling integrated assembly shown in FIG. 20.
Figure 22:
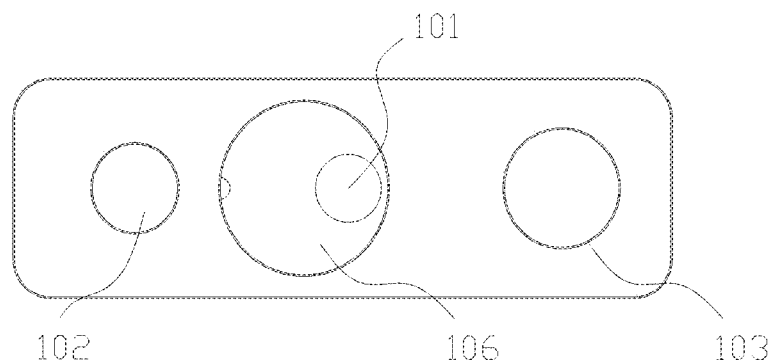
FIG. 22 is a bottom view of FIG. 21.
Figure 23:
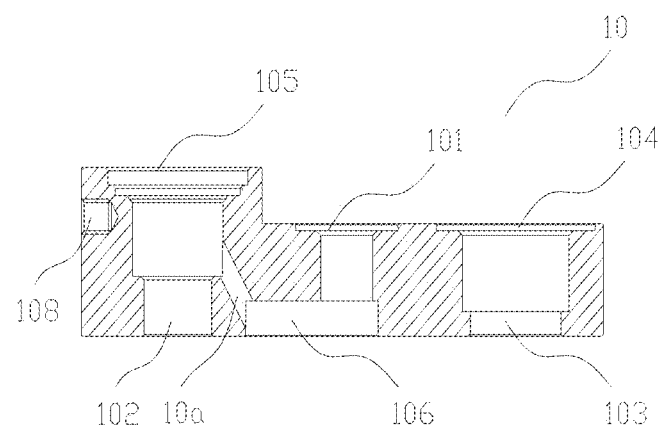
FIG. 23 is a sectional view of the connecting block shown in FIG. 21.

In other embodiments, referring to FIGS. 19-23, FIG. 19 is a structural sectional view of a fourth embodiment of the cooling integrated assembly according to the present application. FIG. 20 is a schematic structural view of the cooling integrated assembly shown in FIG. 19 after a valve core assembly and a coil assembly are removed. FIG. 21 is a schematic structural view of a connecting block in the cooling integrated assembly shown in FIG. 20. FIG. 22 is a bottom view of FIG. 21. FIG. 23 is a sectional view of the connecting block shown in FIG. 21.

The structure of the connecting block in the fourth embodiment is substantially the same as that in the second embodiment and the third embodiment, the hole opening of the mounting hole 105 in the fourth embodiment is also arranged on the outer end surface, the threaded hole 108 is arranged on the side end surface of the connecting block 10, and the drainage flow passage 10a used for being in communication with the first end port 101 of the connecting block and the mounting hole 105 is processed inside the connecting block 10. The inner end surface and the outer end surface of the connecting block 10 are perforated to form the mounting hole 105 and the second end port 102 of the connecting block. In the fourth embodiment, the drainage flow passage 10a includes a communication groove and an inclined passage, the communication groove is provided on the inner end surface, a groove opening of the communication groove forms the processing pre-opening 106 which is in communication with the first end port 101 of the connecting block, as shown in FIG. 19, a sectional area of the processing pre-opening 106 is larger than that of the first end port 101 of the connecting block, the first end port 101 of the connecting block is connected to the processing pre-opening 106 from the top to the bottom, thereby running through the inner end surface and the outer end surface of the connecting block 10. The processing pre-opening 106 is arranged toward the second end port 102 of the connecting block, and the inclined passage of the drainage flow passage 10a is formed by processing from a position of the communication groove close to the second end port 102 of the connecting block to the interior of the communication groove, and the length of the drainage flow passage 10a is relatively short. The refrigerant passes through the first end port 101 of the connecting block, the communication groove of the drainage flow passage 10a, the inclined passage of the drainage flow passage 10a, the valve core component (the position of the mounting hole 105) and the second end port 102 of the connecting block. In this way, the communication groove at the processing pre-opening 106 also serves as the second flow passage of the refrigerant, and the length of the inclined passage of the processed drainage flow passage 10a is relatively short, which may also reduce the flow resistance and the pressure drop to a certain extent.

Figure 24:
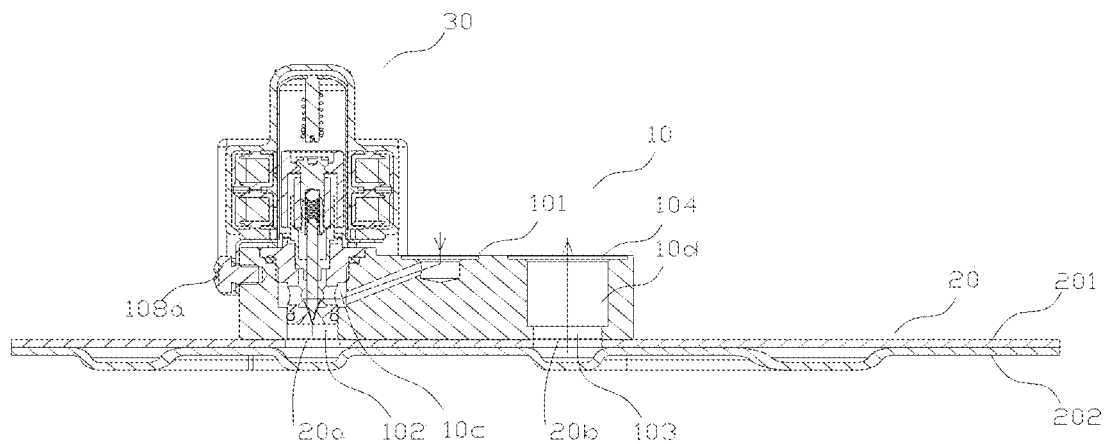
FIG. 24 is a structural sectional view of a fifth embodiment of the cooling integrated assembly according to the present application.
Figure 25:
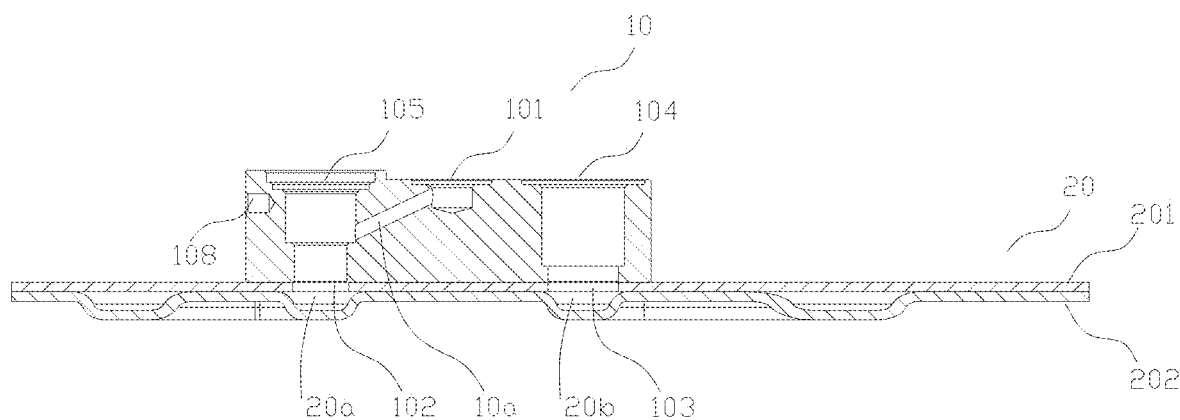
FIG. 25 is a schematic structural view of the cooling integrated assembly shown in FIG. 24 after a valve core assembly is removed.
Figure 26:
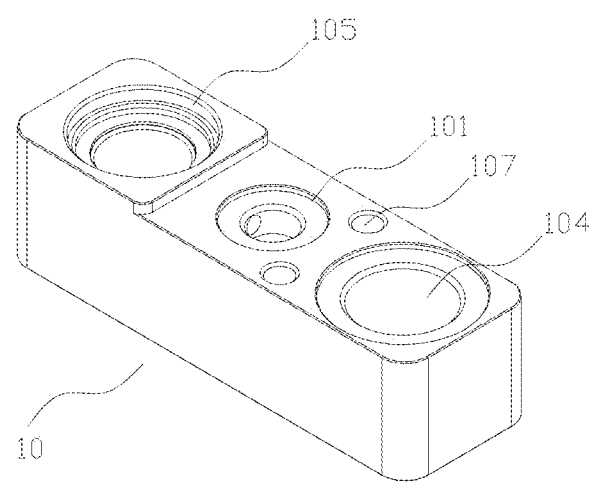
FIG. 26 is a schematic structural view of a connecting block in the cooling integrated assembly shown in FIG. 25.
Figure 27:
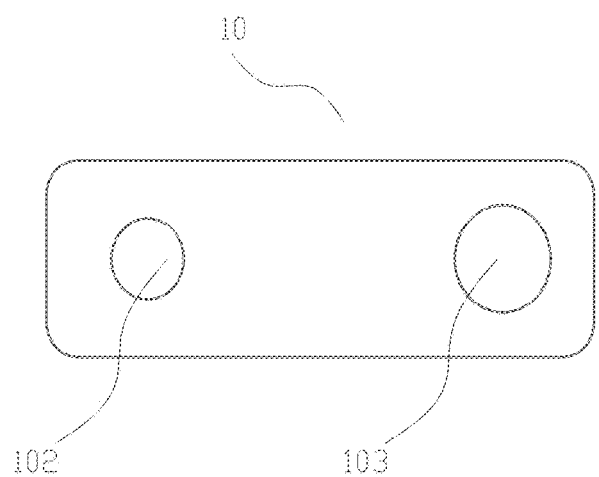
FIG. 27 is a bottom view of FIG. 26.
Figure 28:
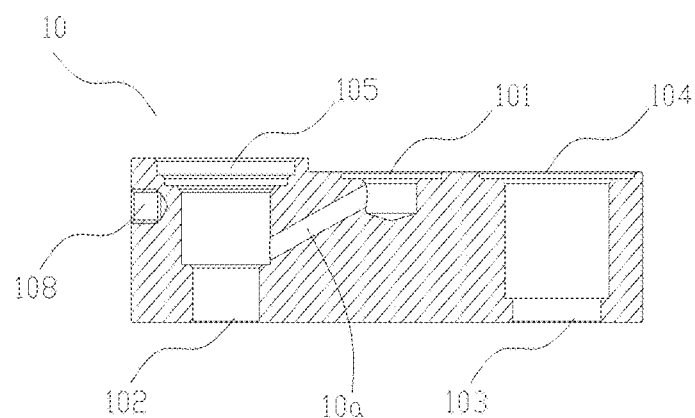
FIG. 28 is a sectional view of the connecting block shown in FIG. 26.
Figure 29:
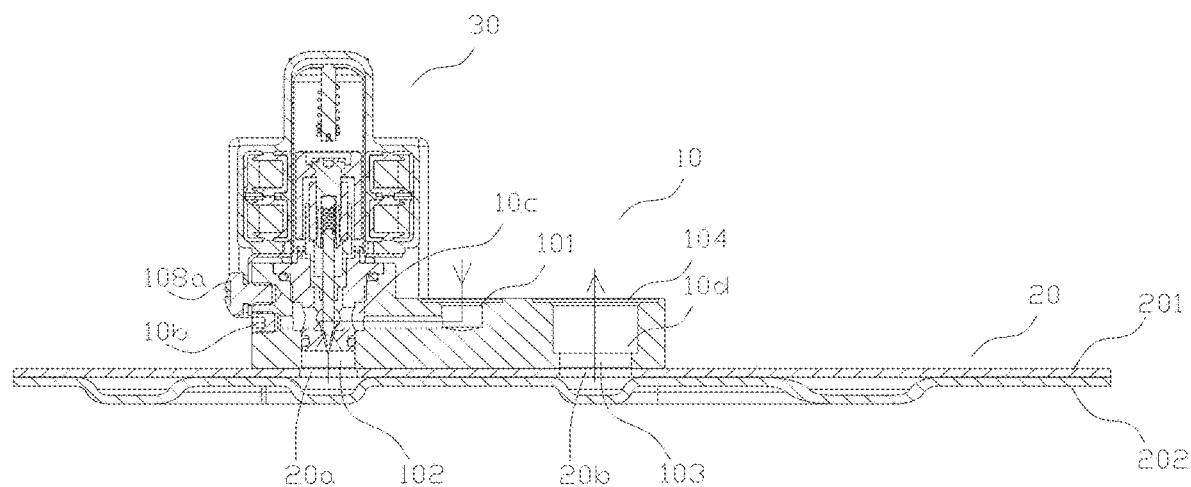
FIG. 29 is a structural sectional view of a sixth embodiment of the cooling integrated assembly according to the present application.

In other embodiments, referring to FIGS. 24-28, FIG. 24 is a structural sectional view of a fifth embodiment of the cooling integrated assembly according to the present application. FIG. 25 is a schematic structural view of the cooling integrated assembly shown in FIG. 24 after the valve core assembly 30 is removed. FIG. 26 is a schematic structural view of the connecting block 10 in the cooling integrated assembly shown in FIG. 25. FIG. 27 is a bottom view of FIG. 26. FIG. 28 is a sectional view of the connecting block 10 shown in FIG. 26.

The structure of the connecting block in the fifth embodiment is substantially the same as that in the second embodiment, the third embodiment and the fourth embodiment, the hole opening of the mounting hole 105 in the fifth embodiment is also arranged on the outer end surface, the threaded hole 108 is arranged on the side end surface of the connecting block 10, and the drainage flow passage 10a used for being in communication with the first end port 101 of the connecting block and the mounting hole 105 is processed inside the connecting block 10. The inner end surface and the outer end surface of the connecting block 10 are perforated to form the mounting hole 105 and the second end port 102 of the connecting block.

In the fifth embodiment, a processing pro-opening is not provided, and the first end port 101 of the connecting block is directly taken as a processing pre-opening, as shown in FIG. 24, the drainage flow passage 10a used for being in communication with a side wall of the first end port 101 of the connecting block and the mounting hole 105 is processed inside the connecting block 10 from the side wall of the first end port 101 of the connecting block. The drainage flow passage 10a is also an inclined passage, the height direction of the connecting block 10 is taken as the vertical direction, the drainage flow passage 10a has an upper end port and a lower end port, the upper end port is in communication with the first end port 101 of the connecting block, the lower end port is in communication with the mounting hole 105. The processing pre-opening does not need to be arranged when the drainage flow passage 10a is formed in the present embodiment, and the inclined direction of the drainage flow passage 10a corresponds to the first end port 101 of the connecting block and an inlet of the valve core component, in FIG. 24, the first end port 101 of the connecting block is located on the outer end surface at the above side, and the inlet position of the valve core component is located at the bottom of the mounting hole 105 at the lower side, the drainage flow passage 10a is also inclined from the top to the bottom, so the flow resistance and the pressure drop are smaller. Apparently, the first end port 101 of the connecting block is used as a processing pre-opening in the present embodiment, which has a relatively high processing requirement.

Figure 30:
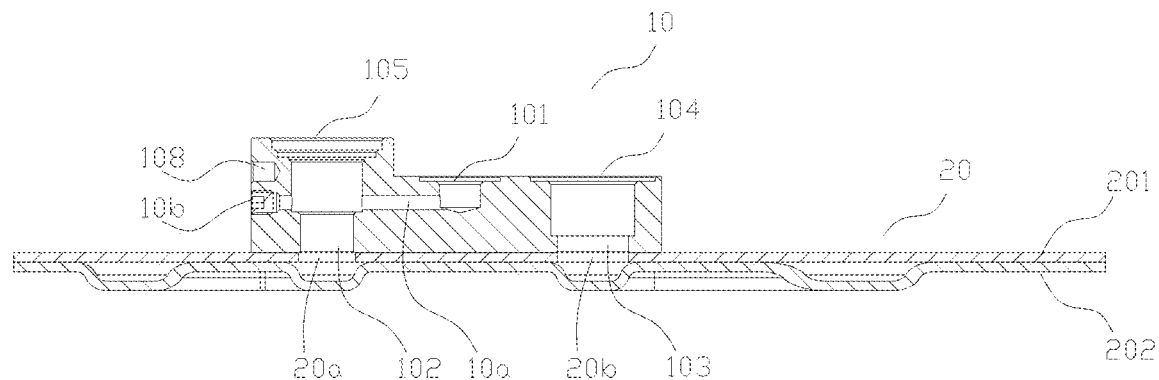
FIG. 30 is a schematic structural view of the cooling integrated assembly shown in FIG. 29 after a valve core assembly is removed.
Figure 31:
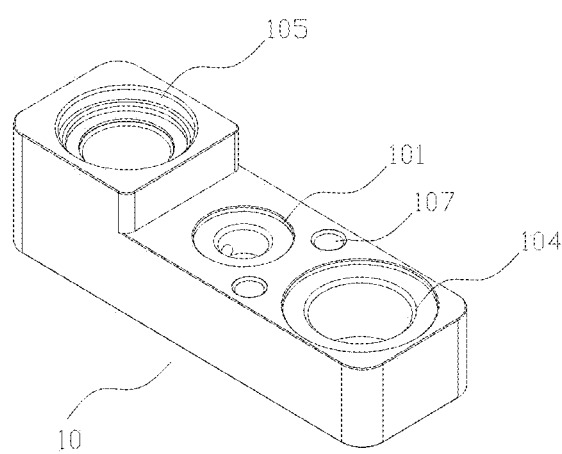
FIG. 31 is a schematic structural view of a connecting block in the cooling integrated assembly shown in FIG. 30.
Figure 32:
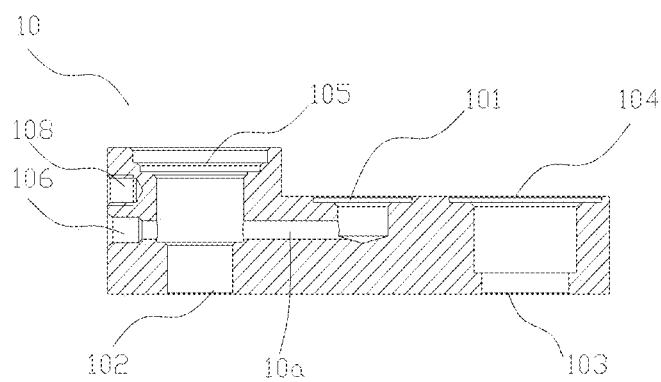
FIG. 32 a sectional view of the connecting block shown in FIG. 31.
Figure 33:
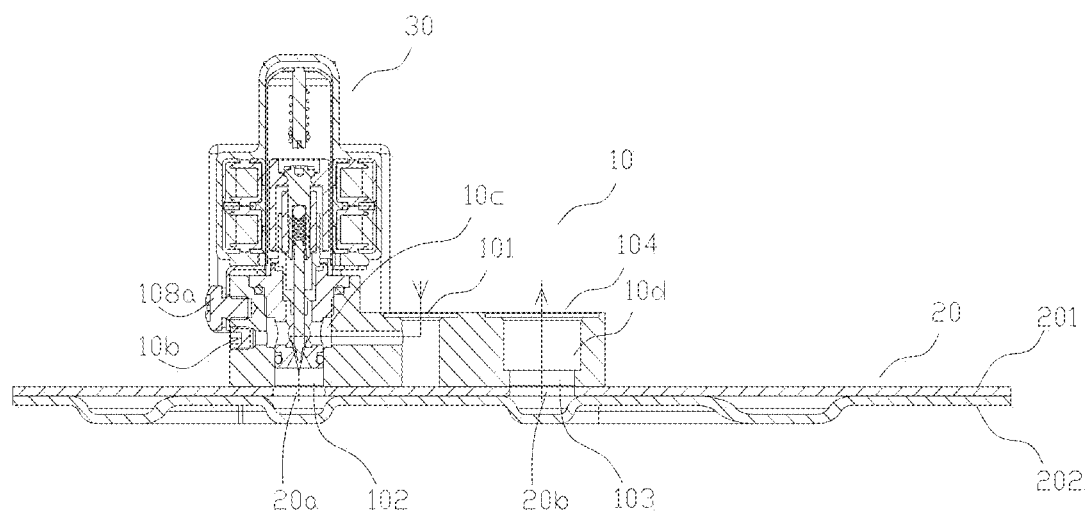
FIG. 33 is a structural sectional view of a seventh embodiment of the cooling integrated assembly according to the present application.

In other embodiments, referring to FIGS. 29-32, FIG. 29 is a structural sectional view of a sixth embodiment of the cooling integrated assembly according to the present application. FIG. 30 is a schematic structural view of the cooling integrated assembly shown in FIG. 29 after the valve core assembly 30 is removed. FIG. 31 is a schematic structural view of the connecting block 10 in the cooling integrated assembly shown in FIG. 30. FIG. 32 a sectional view of the connecting block 10 shown in FIG. 31.

The structure of the connecting block in the sixth embodiment is substantially the same as that in the second embodiment, the third embodiment, the fourth embodiment and the fifth embodiment, the hole opening of the mounting hole 105 in the sixth embodiment is also arranged on the outer end surface, the threaded hole 108 is arranged on the side end surface of the connecting block 10, and the drainage flow passage 10a used for being in communication with the first end port 101 of the connecting block and the mounting hole 105 is processed inside the connecting block 10. The inner end surface and the outer end surface of the connecting block 10 are perforated to form the mounting hole 105 and the second end port 102 of the connecting block.

In the sixth embodiment, a processing pre-opening 106 is provided, and the processing pre-opening 106 is provided on the side end surface of the connecting block 10, and the side end surface is a side of the connecting block 10 toward the mounting hole 105. In this way, the directly processed drainage flow passage 10a runs through the wall portion of the mounting hole 105 formed by the connecting block 10, the drainage flow passage 10a has a first tail end port (an end port at the right shown in FIG. 30) and a second tail end port (an end port at the left shown in FIG. 30), the first tail end port is in communication with the first end port 101 of the connecting block, and the second tail end port is located on the side end surface of the connecting block 10, as shown in the figure, the drainage flow passage 10a is in communication with the first end port 101 of the connecting block and the mounting hole 105 in a laterally perpendicular direction. In this way, the processing process is simple and easy to implement, and compared with the second embodiment, the flow resistance and the pressure drop of the refrigerant when passing through the drainage flow passage 10a are smaller.

Since the processing pre-opening 106 is located on the side end surface of the connecting block 10, the position of the processing pre-opening 106 may be blocked by a plug 10b, which realizes effective sealing, as shown in FIG. 30.

Figure 34:
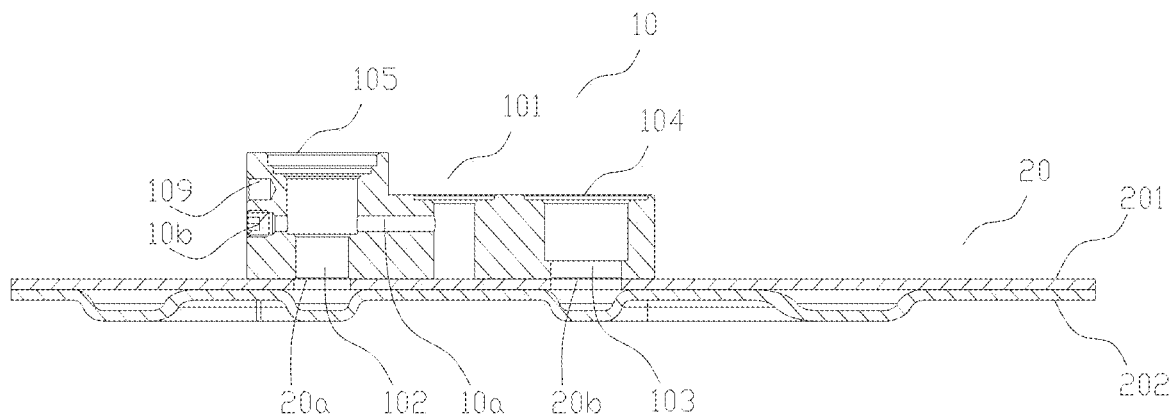
FIG. 34 is a schematic structural view of the cooling integrated assembly shown in FIG. 33 after a valve core assembly is removed.
Figure 35:
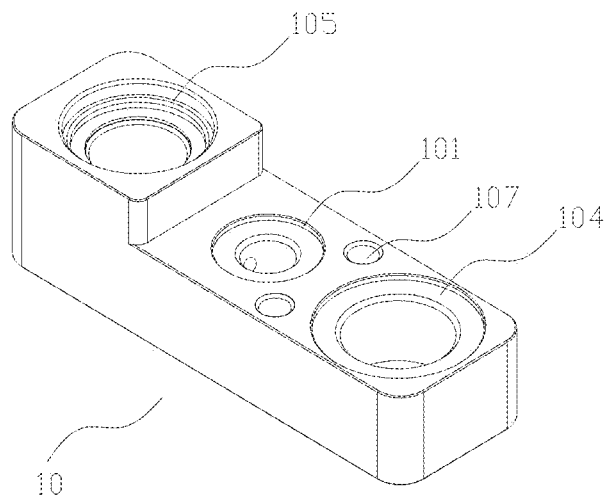
FIG. 35 is a schematic structural view of a connecting block in the cooling integrated assembly shown in FIG. 34.
Figure 36:
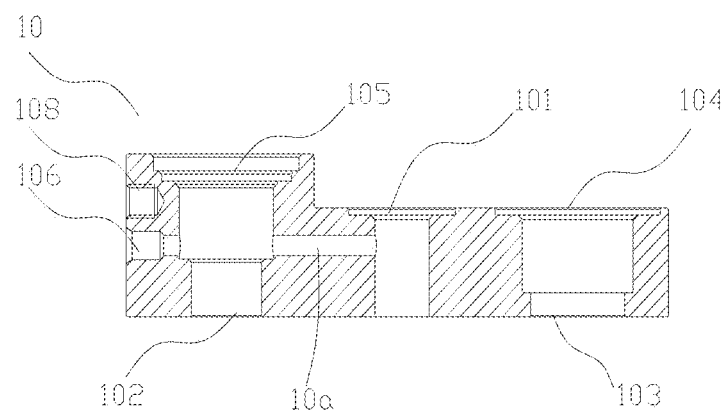
FIG. 36 is a sectional view of the connecting block shown in FIG. 35.
Figure 37:
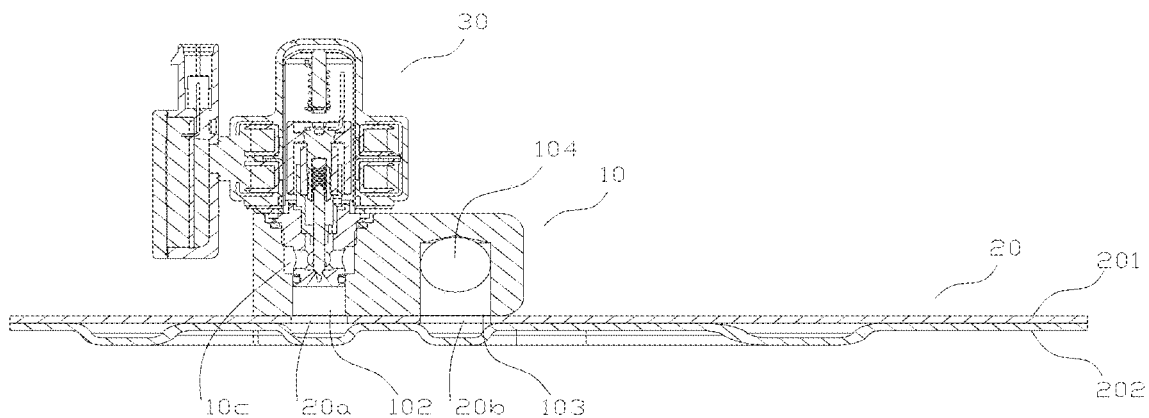
FIG. 37 is a structural sectional view of an eighth embodiment of the cooling integrated assembly according to the present application.

In other embodiments, referring to FIG. 33-36, FIG. 33 is a structural sectional view of a seventh embodiment of the cooling integrated assembly according to the present application. FIG. 34 is a schematic structural view of the cooling integrated assembly shown in FIG. 33 after the valve core assembly 30 is removed. FIG. 35 is a schematic structural view of the connecting block 10 in the cooling integrated assembly shown in FIG. 34. FIG. 36 is a sectional view of the connecting block 10 shown in FIG. 35.

The structure of the connecting block in the seventh embodiment is substantially the same as that in the sixth embodiment. The only difference is that in the seventh embodiment, when the first end port 101 of the connecting block is machined, the inner end surface and the outer end surface of the connecting block 10 are perforated, and a through opening of the inner end surface is sealed when in cooperation with the bottom plate 201 of the cooling assembly 20. Compared with the sixth embodiment, when the refrigerant flows through the first end port 101 of the connecting block and then enters into the drainage flow passage 10a, the flow resistance and the pressure drop are reduced. Apparently, the position of the inner end surface after being run through needs to be dependent on the attaching and welding with the bottom plate 201 to realize sealing.

Figure 38:
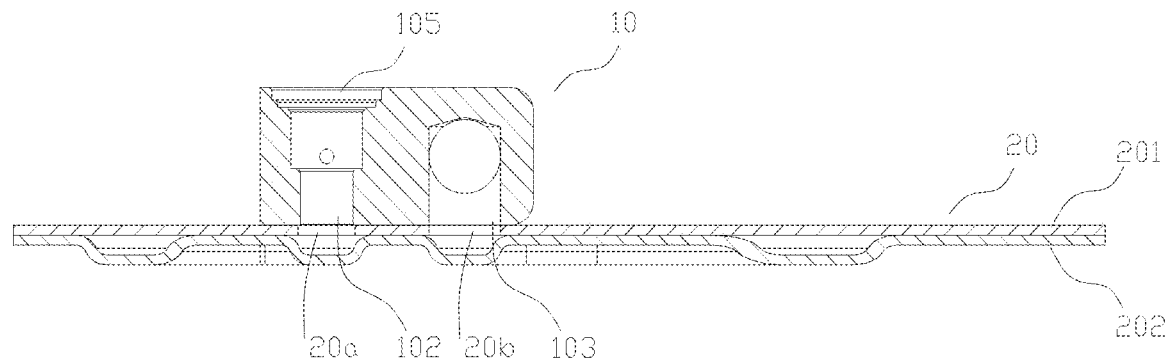
FIG. 38 is a schematic structural view of the cooling integrated assembly shown in FIG. 37 after a valve core assembly is removed.
Figure 39:
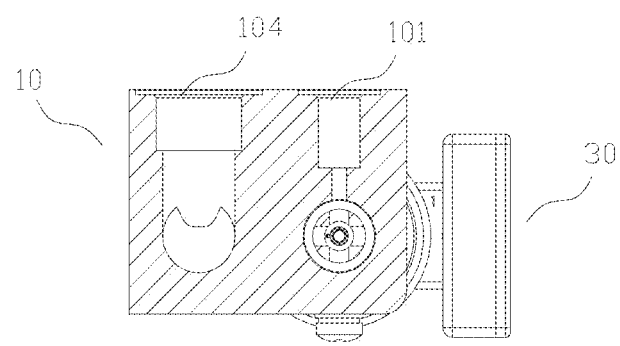
FIG. 39 is a transverse sectional view of positions corresponding to a first end port and a fourth end port of the connecting block shown in FIG. 37.
Figure 40:
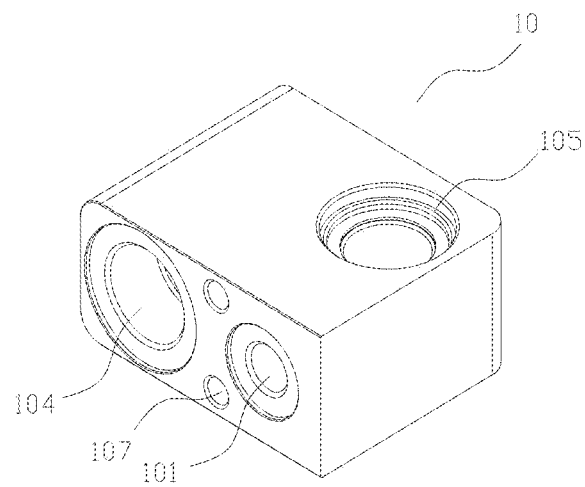
FIG. 40 is a schematic structural view of a connecting block in the cooling integrated assembly shown in FIG. 37.
Figure 41:
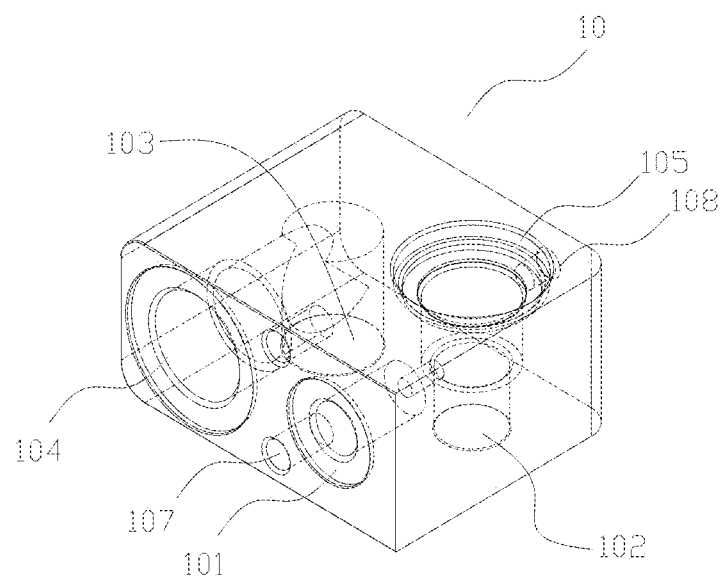
FIG. 41 is a perspective view of the connecting block in FIG. 40.
Figure 42:
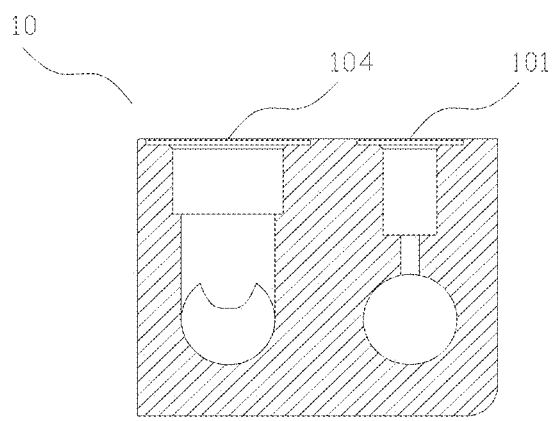
FIG. 42 is a transverse sectional view of the connecting block taken along a plane where axis of a first end port and a fourth end port of the connecting block shown in FIG. 41 are located.
Figure 43:
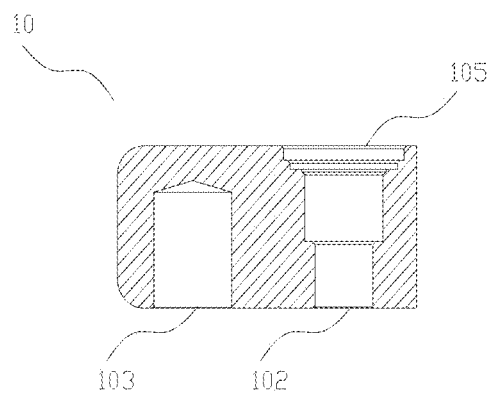
FIG. 43 is a vertical sectional view of the connecting block taken along a plane where axis of a third end port and a second end port of the connecting block shown in FIG. 41 are located.

In other embodiments, referring to FIGS. 37-43, FIG. 37 is a structural sectional view of an eighth embodiment of the cooling integrated assembly according to the present application. FIG. 38 is a schematic structural view of the cooling integrated assembly shown in FIG. 37 after the valve core assembly 30 is removed. FIG. 39 is a transverse sectional view of positions corresponding to the first end port 101 and the fourth end port 104 of the connecting block shown in FIG. 37. FIG. 40 is a schematic structural view of the connecting block 10 in the cooling integrated assembly shown in FIG. 37. FIG. 41 is a perspective view of FIG. 40. FIG. 42 is a transverse sectional view of the connecting block taken along a plane where axis of the first end port 101 and the fourth end port 104 of the connecting block shown in FIG. 41 are located. FIG. 43 is a vertical sectional view of the connecting block taken along a plane where axis of the third end port 103 and the second end port 102 of the connecting block shown in FIG. 41 are located.

The structure of the connecting block 10 in the present embodiment is different from that in the above embodiments, and other structures are substantially the same, the connecting mode and the communicating mode of the connecting block 10 and the cooling assembly 20 are also substantially the same, and repeated description is not repeated herein.

As shown in FIG. 41, the first end port 101 and the fourth end port 104 of the connecting block in the present embodiment are located on the side end surface of the connecting block 10, and the second end port 102 and the third end port 103 of the connecting block are still located on the inner end surface. The mounting hole 105 for mounting the valve core component is located on the outer end surface of the connecting block 10.

The perspective view shown in FIG. 41 shows the internal hole passage structure in dotted lines, the inner end surface and the outer end surface of the connecting block 10 are perforated to form the mounting hole 105 and the second end port 102 of the connecting block, the first end port 101 of the connecting block arranged on the side end surface is in perpendicular communication with the mounting hole 105; the third end port 103 of the connecting block formed by extending upward from the inner end surface does not need to run through the outer end surface, as shown in FIG. 43, the fourth end port 104 of the connecting block arranged on the side end surface is in communication with the third end port 103 of the connecting block in a perpendicular direction.

The refrigerant laterally enters the interior of the connecting block 10, and then vertically enters the mounting hole 105 and enters into the cooling assembly 20 after being throttled by the valve core component, after heat exchange, the refrigerant vertically flows into the interior of the connecting block 10 from the third end port 103 of the connecting block, and then laterally flows out of the cooling integrated assembly through the fourth end port 104 of the connecting block.

It should be understood that when the cooling integrated assembly is mounted on the automobile, the cooling integrated assembly is generally arranged at a battery position at the bottom of the automobile, and the inner end surface and the outer end surface of the cooling integrated assembly are vertically arranged to facilitate the attaching of the battery. The first end port 101 and the fourth end port 104 of the connecting block need to be connected to the external connection pipe, and first end port 101 and the fourth end port 104 of the connecting block in the present embodiment are located on the side end surface, so when the external connection pipe is mounted or disassembled, an operator only needs to operate from the side surface, which is not limited by the mounting space.

It may be understood that, in the eighth embodiment, the mounting hole 105 is not limited to be provided on the outer end surface, the mounting hole 105 may also be provided on the side end surface, for example, the mounting hole 105 may be provided on the side end surface adjacent to the first end port 101 of the connecting block shown in FIG. 41. Apparently, when the mounting hole 105 is provided on the outer end surface of the connecting block 10, the inner end surface and the outer end surface may be directly perforated to form the second end port 102 of the connecting block while forming the mounting hole 105, and the flow resistance and the pressure drop are relatively small when the refrigerant flows.

In the above embodiments, the cooling assembly 10 is attached to the battery to achieve cooling, which is taken as an example for illustration, it should be understood that the cooling integrated assembly is not limited to cooling the battery of a vehicle, and may be applied to other occasions where contact heat exchange is required.

The above is only a preferred embodiment of the present application, it should be noted that those skilled in the art can make multiple improvements and modifications without departing from the principle of the present application, and these improvements and modifications should also be considered as the protection scope of the present application.

The invention claimed is:

1. A cooling integrated assembly, comprising:
a cooling assembly, and
a valve assembly,
wherein, the cooling assembly has a first connecting port and a second connecting port, the valve assembly and the cooling assembly are fixedly arranged; the valve assembly comprises a connecting block and a valve core assembly, the connecting block has a mounting hole, and at least part of the valve core assembly is located in the mounting hole;
the valve assembly comprises a first fluid passage, and one end of the first fluid passage is a first end port of the connecting block, the other end of the first fluid passage is a second end port of the connecting block, the second end port of the connecting block is located on an inner end surface of the connecting block, the inner end surface faces the cooling assembly, the first connecting port is in communication with the second end port of the connecting block, and a flow area of the first fluid passage is equal to or greater than zero, and is configured to switch between zero and a specified flow area of the first fluid passage; the cooling assembly comprises a bottom plate and a circulation plate, and the bottom plate is fitted with the circulation plate, the cooling assembly comprises a second fluid passage, the second fluid passage is located between the bottom plate and the circulation plate, the second fluid passage is in communication with the first connecting port and the second connecting port,
a refrigerant is circulatable in the first fluid passage and the second fluid passage,
the outer end surface of the connecting block is partially provided with an inclined surface, and the hole opening of the mounting hole is provided at the inclined surface, the connecting block is in a thin block shape, and the outer end surface of the connecting block forms a step at the position of the mounting hole, a top surface of the step is an inclined surface, the through hole vertically runs through the inclined surface to the inner end surface, one end of the through hole is the hole opening of the mounting hole, and the other end port is the second end port of the connecting block, an equivalent diameter of the hole opening of the mounting hole is greater than that of a passage section of the drainage flow passage, so that the mounting hole serves as a processing pre-opening of the drainage flow passage.

2. The cooling integrated assembly according to claim 1, wherein, the circulation plate is provided with a protrusion and a groove, the protrusion protrudes toward a direction away from the bottom plate, and the groove is opposite to the protrusion, the groove is located on one side of the circulation plate facing the bottom plate, and a second fluid passage is located between a wall portion of the circulation plate forming the groove and the bottom plate; the bottom plate is fixed to the connecting block, and the bottom plate comprises a flat plate portion, the flat plate portion is arranged on a side portion of the bottom plate fixed to the connecting block; a thickness of the bottom plate is 0.8-2.5 mm, a thickness of the circulation plate is 0.8-2.5 mm.

3. The cooling integrated assembly according to claim 2, wherein, the circulation plate comprises a main body portion, the groove extends continuously, the main body portion is sealed to the bottom plate, and the groove comprises a first tail end portion and a second tail end portion, a position of the first tail end portion is opposite to the first connecting port, a position of the second tail end portion is opposite to the second connecting port;
the connecting block further comprises a third end port and a fourth end port of the connecting block which are in communication with each other; the valve assembly further comprises a third fluid passage, one end of the third fluid passage is the third end port of the connecting block, the other end of the third fluid passage is the fourth end port of the connecting block, the first end port and the fourth end port of the connecting block are located on a same end surface of the connecting block;
the valve core assembly comprises a valve needle and a throttling hole, the throttling hole is an end portion of the first fluid passage, a gap is provided between the valve needle and a wall portion of the valve core assembly forming the throttling hole, a flow area of the throttling hole is more than zero; or the valve needle inserts into the throttling hole, the flow area of the throttling hole is equal to zero.

4. The cooling integrated assembly according to claim 3, wherein, the first end port and the fourth end port of the connecting block are located on the outer end surface of the connecting block that opposite to the inner end surface; a hole opening of the mounting hole is provided on the side end surface of the connecting block, and the mounting hole is configured to allow the first end port of the connecting block to be in communication with the second end port of the connecting block.

5. The cooling integrated assembly according to claim 3, wherein, the first end port and the fourth end port of the connecting block are located on the side end surface of the connecting block; the hole opening of the mounting hole is located on the outer end surface of the connecting block that is opposite to the inner end surface; or the first end port of the connecting block, the fourth end port of the connecting block and the hole opening of the mounting hole are located on the side end surface of the connecting block, and the hole opening of the mounting hole with the first end port and the fourth end port of the connecting block are located on different side end surfaces.

6. The cooling integrated assembly according to claim 3, wherein, the hole opening of the mounting hole and the first end port and the fourth end port of the connecting block are located on the outer end surface of the connecting block that is opposite to the inner end surface; a drainage flow passage is arranged in an interior of the connecting block, the drainage flow passage is in communication with the first end port of the connecting block and the mounting hole.

7. The cooling integrated assembly according to claim 6, wherein, an equivalent diameter of the hole opening of the mounting hole is greater than an equivalent diameter of a passage section of the drainage flow passage, the drainage flow passage is an inclined passage, a height direction of the connecting block is taken as a vertical direction, the drainage flow passage has an upper end port and a lower end port, the upper end port is in communication with the mounting hole, the lower end port is in communication with the first end port of the connecting block; or the drainage flow passage run through a side wall portion of the connecting block, the side wall portion is a side wall portion forming the mounting hole, the drainage flow passage has a first tail end port and a second tail end port, the first tail end port is in communication with the first end port of the connecting block, and the second tail end port is located on an end surface of the side wall portion.

8. The cooling integrated assembly according to claim 7, wherein, the drainage flow passage further comprises a communication groove, one end of the inclined passage is in communication with the mounting hole, and the other end of the inclined passage is in communication with the communication groove, the communication groove is provided on the inner end surface of the connecting block.

9. The cooling integrated assembly according to claim 6, wherein, the outer end surface is partially an inclined surface, the hole opening of the mounting hole is located on the inclined surface, the equivalent diameter of the hole opening of the mounting hole is greater than the equivalent diameter of a passage section of the drainage flow passage.

10. The cooling integrated assembly according to claim 9, wherein, the cooling integrated assembly comprises a fixing member, the connecting block is provided with a first fixing hole, the cooling assembly is provided with a second fixing hole, the first fixing hole corresponds to the second fixing hole, a diameter of a tail end of the fixing member is greater than that of the first fixing hole and the second fixing hole, a large end portion of the fixing member inserts into the first fixing hole and the second fixing hole, and the fixing member is in threaded fit with the first fixing hole and the second fixing hole, the tail end of the fixing member does not insert into the first fixing hole and the second fixing hole, the tail end of the fixing member abuts against a bottom of the cooling assembly.

11. The cooling integrated assembly according to claim 9, wherein, the cooling integrated assembly comprises a fixing plate and a fixing member, the fixing plate comprises at least two side portions, and one of the side portions abuts against the connecting block, the other of the side portions abuts against the cooling assembly, the two side portions of the fixing plate are respectively provided with through holes, and the connecting block is provided with through holes, the through holes in the fixing plate corresponds to the through holes in the connecting block, and the fixing member inserts into the through holes of the fixing plate and the through holes of the connecting block, and the fixing member is in threaded fit with the through holes of the fixing plate and the through holes of the connecting block; or the cooling integrated assembly comprises two fixing plates and two fixing members, and one side portion of the one of the fixing plates abuts against the connecting block, and one side portion of the other of the fixing plates abuts against the cooling assembly.

12. The cooling integrated assembly according to claim 9, wherein, the connecting block is fixed to the cooling assembly by welding.

13. The cooling integrated assembly according to claim 1, wherein, the connecting block is fixed to the cooling assembly by welding, the bottom plate comprises the protrusion, the protrusion protrudes toward the direction of the connecting block, the groove is arranged on the inner end surface of the connecting block, the groove of the connecting block is fixed to the protrusion by welding, or the connecting block comprises the protrusion, the protrusion protrudes toward the bottom plate, the bottom plate is provided with the groove, and the protrusion is fixed to the groove of the bottom plate by welding.

14. A battery assembly, comprising a battery module and the cooling integrated assembly according to claim 1, the integrated cooling assembly comprises a cooling assembly, the bottom plate comprises a flat plate portion, and the flat plate portion is located at a side of the bottom plate opposite to the circulation plate, at least part of the battery module is in contact with the flat plate portion or is in contact with the flat plate portion through a heat conduction element.

15. A battery assembly, comprising a battery module and the cooling integrated assembly according to claim 2, the integrated cooling assembly comprises a cooling assembly, the bottom plate comprises a flat plate portion, and the flat plate portion is located at a side of the bottom plate opposite to the circulation plate, at least part of the battery module is in contact with the flat plate portion or is in contact with the flat plate portion through a heat conduction element.

16. A battery assembly, comprising a battery module and the cooling integrated assembly according to claim 3, the integrated cooling assembly comprises a cooling assembly, the bottom plate comprises a flat plate portion, and the flat plate portion is located at a side of the bottom plate opposite to the circulation plate, at least part of the battery module is in contact with the flat plate portion or is in contact with the flat plate portion through a heat conduction element.

17. A battery assembly, comprising a battery module and the cooling integrated assembly according to claim 4, the integrated cooling assembly comprises a cooling assembly, the bottom plate comprises a flat plate portion, and the flat plate portion is located at a side of the bottom plate opposite to the circulation plate, at least part of the battery module is in contact with the flat plate portion or is in contact with the flat plate portion through a heat conduction element.

18. A battery assembly, comprising a battery module and the cooling integrated assembly according to claim 5, the integrated cooling assembly comprises a cooling assembly, the bottom plate comprises a flat plate portion, and the flat plate portion is located at a side of the bottom plate opposite to the circulation plate, at least part of the battery module is in contact with the flat plate portion or is in contact with the flat plate portion through a heat conduction element.

19. A battery assembly, comprising a battery module and the cooling integrated assembly according to claim 6, the integrated cooling assembly comprises a cooling assembly, the bottom plate comprises a flat plate portion, and the flat plate portion is located at a side of the bottom plate opposite to the circulation plate, at least part of the battery module is in contact with the flat plate portion or is in contact with the flat plate portion through a heat conduction element.

20. A battery assembly, comprising a battery module and the cooling integrated assembly according to claim 7, the integrated cooling assembly comprises a cooling assembly, the bottom plate comprises a flat plate portion, and the flat plate portion is located at a side of the bottom plate opposite to the circulation plate, at least part of the battery module is in contact with the flat plate portion or is in contact with the flat plate portion through a heat conduction element.

* * * * *